United States Patent
Khoshnevisan et al.

(10) Patent No.: US 11,777,663 B2
(45) Date of Patent: Oct. 3, 2023

(54) TYPE 3 HYBRID AUTOMATIC REPEAT REQUEST ACKNOWLEDGMENT

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 17/165,732

(22) Filed: Feb. 2, 2021

(65) Prior Publication Data

US 2021/0242977 A1   Aug. 5, 2021

Related U.S. Application Data

(60) Provisional application No. 62/970,069, filed on Feb. 4, 2020.

(51) Int. Cl.
*H04L 5/00* (2006.01)
*H04L 1/1812* (2023.01)
(Continued)

(52) U.S. Cl.
CPC .......... *H04L 1/1819* (2013.01); *H04L 1/0061* (2013.01); *H04L 5/0055* (2013.01);
(Continued)

(58) Field of Classification Search
CPC ... H04L 1/1819; H04L 1/0061; H04L 5/0055; H04W 76/11; H04W 72/23; H04W 72/0453
See application file for complete search history.

(56) References Cited

U.S. PATENT DOCUMENTS

2021/0168776 A1\* 6/2021 Li ..................... H04L 1/1861
2021/0176012 A1\* 6/2021 Xu ................... H04W 52/0229
(Continued)

FOREIGN PATENT DOCUMENTS

CN         107070605 A     8/2017

OTHER PUBLICATIONS

3GPP TS 38.213, "3rd Generation Partnership Project; Technical Specification Group Radio Access Network, NR; Physical Layer Procedures for Control (Release 16)", 3GPP Standard, Technical Specification, 3GPP TS 38.213, 3rd Generation Partnership Project (3GPP), Mobile Competence Centre, 650, Route Des Lucioles, F-06921, Sophia-Antipolis, Cedex, France, vol. RAN WG1, No. V16.0.0, Dec. 2019, Jan. 14, 2020 (Jan. 14, 2020), XP051860806, pp. 1-146, Retrieved from the Internet: URL: http://ftp.3gpp.org/Specs/archive/38_series/38.213/38213-g00.zip 38213-g00. docx[retrieved on Jan. 14, 2020], paragraph [09.1].

(Continued)

*Primary Examiner* — Michael J Moore, Jr.
(74) *Attorney, Agent, or Firm* — QUALCOMM Incorporated

(57) ABSTRACT

Various aspects of the present disclosure generally relate to wireless communication. In some aspects, a user equipment (UE) may receive a downlink control information (DCI) message, the DCI message including at least a first field and a second field, the first field indicating a request for Type 3 hybrid automatic repeat request (HARD) acknowledgment (HARQ-ACK), the second field indicating a physical downlink shared channel (PDSCH) communication is not scheduled when a value of the second field includes: all zeros if resource allocation Type 0 is configured, all ones if resource allocation Type 1 is configured, or all ones or all zeros in a dynamic switch configuration. The UE may transmit the (Continued)

Type 3 HARQ-ACK based at least in part on the DCI message. Numerous other aspects are described.

32 Claims, 11 Drawing Sheets

(51) Int. Cl.
*H04W 76/11* (2018.01)
*H04W 72/0453* (2023.01)
*H04L 1/00* (2006.01)
*H04W 72/23* (2023.01)

(52) U.S. Cl.
CPC ....... *H04W 72/0453* (2013.01); *H04W 72/23* (2023.01); *H04W 76/11* (2018.02)

(56) References Cited

U.S. PATENT DOCUMENTS

| | | | | |
|---|---|---|---|---|
| 2021/0242977 | A1* | 8/2021 | Khoshnevisan | H04L 1/1896 |
| 2021/0258107 | A1* | 8/2021 | Khoshnevisan | H04W 72/23 |
| 2022/0007399 | A1* | 1/2022 | Rastegardoost | H04W 72/1273 |
| 2022/0303064 | A1* | 9/2022 | Yang | H04W 72/23 |
| 2022/0353853 | A1* | 11/2022 | Wu | H04L 1/1854 |
| 2022/0385411 | A1* | 12/2022 | Lei | H04L 1/1812 |
| 2022/0394682 | A1* | 12/2022 | Nory | H04W 72/0453 |

OTHER PUBLICATIONS

Ad-Hoc Chair (Ericsson): "Chairman's Notes of AI 7.2.2 NR-Based Access to Unlicensed Spectrum", 3GPP Draft, R1-1913383, 3GPP TSG-RAN WG1 Meeting #99, 3rd Generation Partnership Project (3GPP), Mobile Competence Centre, 650, Route Des Lucioles, F-06921 Sophia-Antipolis Cedex, France, vol. RAN WG1. No. Reno. Nevada. USA, Nov. 18, 2019-Nov. 22, 2019, Nov. 25, 2019 (Nov. 25, 2019), XP051830664, 21 Pages, Retrieved from the Internet: URL:https://ftp.3gpp.org/tsg_ran/WG1_RL1/TSGR1_99/Docs/R1-1913383.zip R1-1913383.doc [retrieved on Nov. 25, 2019], paragraph [7.2.2.2.3].

Partial International Search Report—PCT/US2021/016416—ISA/EPO—dated May 7, 2021.

VIVO: "Discussion on HARQ Operation for NR-U", 3GPP Draft, R1-1912014, 3GPP TSG RAN WG1#99, 3rd Generation Partnership Project (3GPP), Mobile Competence Centre, 650, Route Des Lucioles, F-06921 Sophia-Antipolis Cedex, France, vol. RAN WG1. No. Reno. USA, Nov. 18, 2019-Nov. 22, 2019, Nov. 8, 2019 (Nov. 8, 2019), XP051819908, 13 Pages, Retrieved from the Internet: URL:https://ftp.3gpp.org/tsg_ran/WG1_RL1/TSGR1_99/Docs/R1-1912014.zip R1-1912014-Discussion on HARQ Operation for NR-U.docx [retrieved on Nov. 8, 2019], Paragraph [2.1.3].

International Search Report and Written Opinion—PCT/US2021/016416—ISA/EPO—dated Jun. 28, 2021.

* cited by examiner

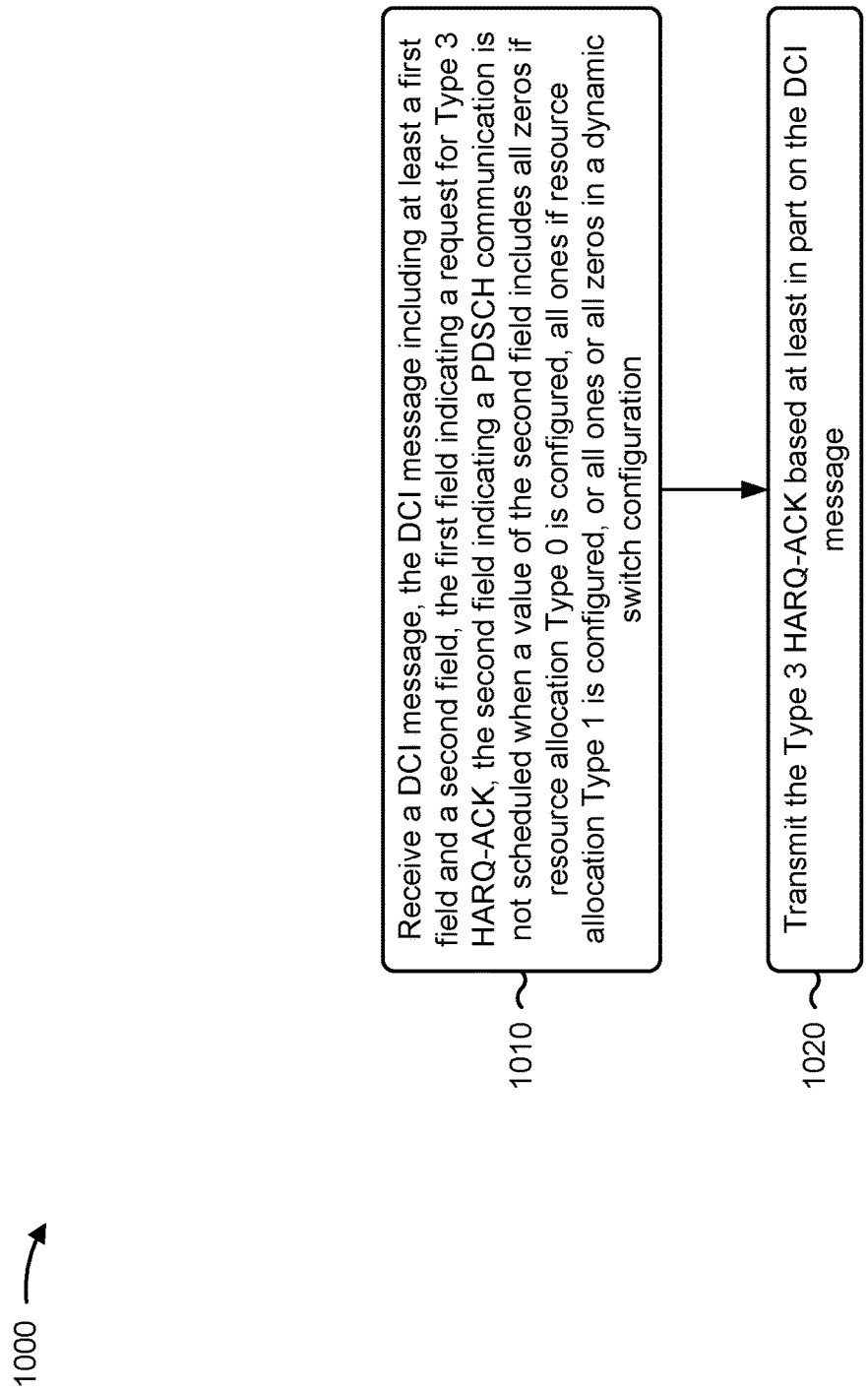

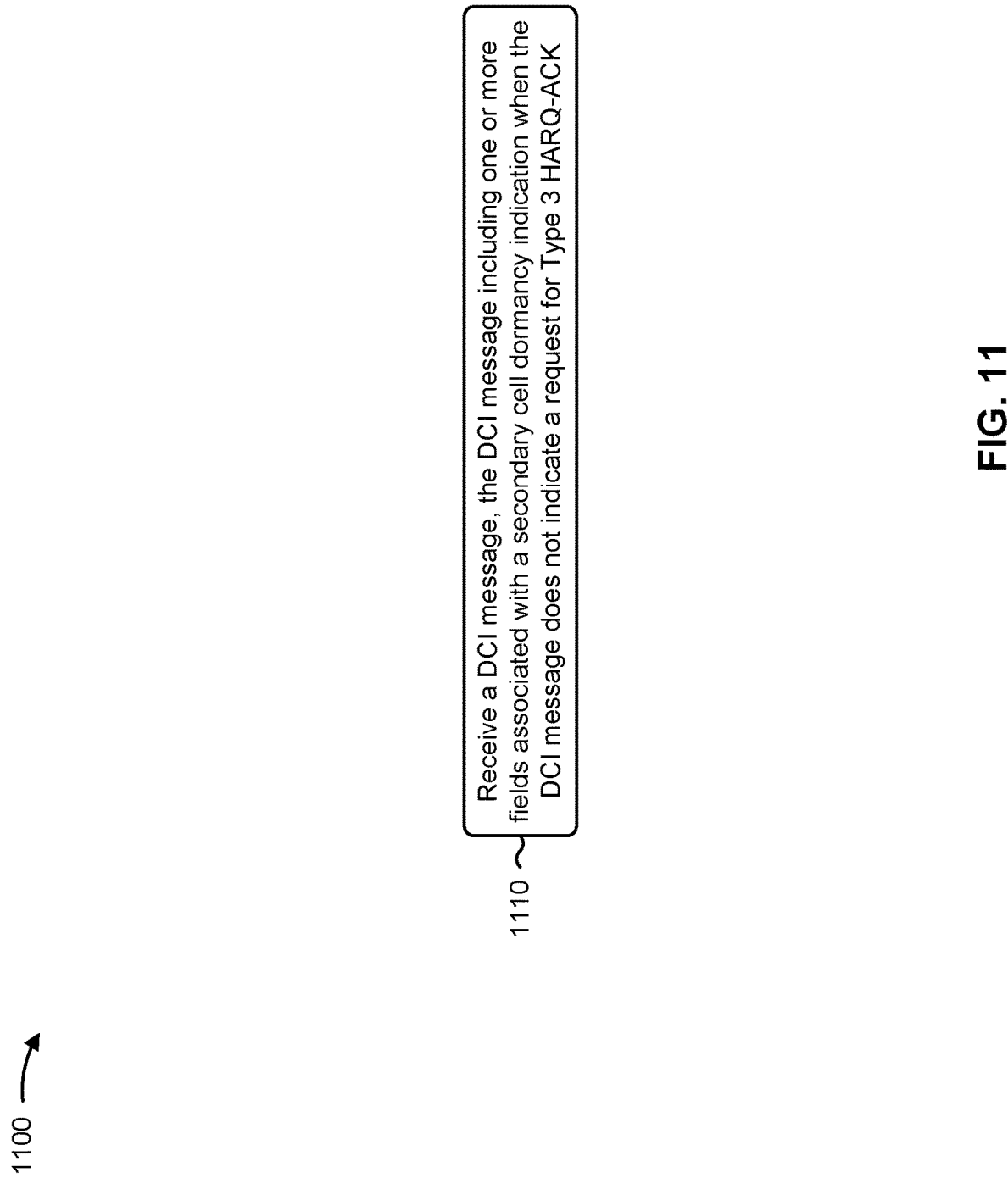

TYPE 3 HYBRID AUTOMATIC REPEAT REQUEST ACKNOWLEDGMENT

CROSS-REFERENCE TO RELATED APPLICATION

This Patent Application claims priority to Provisional Patent Application No. 62/970,069, filed on Feb. 4, 2020, entitled "TYPE 3 HYBRID AUTOMATIC REPEAT REQUEST ACKNOWLEDGMENT," and assigned to the assignee hereof. The disclosure of the prior Applications is considered part of and is incorporated by reference in this Patent Application.

FIELD OF THE DISCLOSURE

Aspects of the present disclosure generally relate to wireless communication and to techniques and apparatuses for Type 3 hybrid automatic repeat request acknowledgment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a downlink control information (DCI) message, the DCI message including at least a first field and a second field, the first field indicating a request for Type 3 hybrid automatic repeat request (HARD) acknowledgment (HARQ-ACK), the second field indicating a physical downlink shared channel (PDSCH) communication is not scheduled when a value of the second field includes: all zeros if resource allocation Type 0 is configured, all ones if resource allocation Type 1 is configured, or all ones or all zeros in a dynamic switch configuration; and transmitting the Type 3 HARQ-ACK based at least in part on the DCI message.

In some aspects, a method of wireless communication performed by a UE includes receiving a DCI message, the DCI message including one or more fields associated with a secondary cell dormancy indication when the DCI message does not indicate a request for Type 3 HARQ-ACK.

In some aspects, a UE for wireless communication includes a memory; and one or more processors operatively coupled to the memory, the one or more processors configured to: receive a DCI message, the DCI message including at least a first field and a second field, the first field indicating a request for Type 3 HARQ-ACK, the second field indicating a PDSCH communication is not scheduled when a value of the second field includes: all zeros if resource allocation Type 0 is configured, all ones if resource allocation Type 1 is configured, or all ones or all zeros in a dynamic switch configuration; and transmit the Type 3 HARQ-ACK based at least in part on the DCI message.

In some aspects, a UE for wireless communication includes a memory; and one or more processors operatively coupled to the memory, the one or more processors configured to: receive a DCI message, the DCI message including one or more fields associated with a secondary cell dormancy indication when the DCI message does not indicate a request for Type 3 HARQ-ACK.

In some aspects, an apparatus for wireless communication includes means for receiving a DCI message, the DCI message including at least a first field and a second field, the first field indicating a request for Type 3 HARQ-ACK, the second field indicating a PDSCH communication is not scheduled when a value of the second field includes: all zeros if resource allocation Type 0 is configured, all ones if resource allocation Type 1 is configured, or all ones or all zeros in a dynamic switch configuration; and means for transmitting the Type 3 HARQ-ACK based at least in part on the DCI message.

In some aspects, an apparatus for wireless communication includes means for receiving a DCI message, the DCI message including one or more fields associated with a secondary cell dormancy indication when the DCI message does not indicate a request for Type 3 HARQ-ACK.

In some aspects, a non-transitory computer-readable medium storing a set of instructions for wireless communication includes one or more instructions that, when executed by one or more processors of a UE, cause the UE to: receive a DCI message, the DCI message including at least a first field and a second field, the first field indicating a request for Type 3 HARQ-ACK, the second field indicating a PDSCH communication is not scheduled when a value of the second field includes: all zeros if resource allocation Type 0 is configured, all ones if resource allocation Type 1 is configured, or all ones or all zeros in a dynamic switch configuration; and transmit the Type 3 HARQ-ACK based at least in part on the DCI message.

In some aspects, a non-transitory computer-readable medium storing a set of instructions for wireless communication includes one or more instructions that, when executed by one or more processors of a UE, cause the UE to: receive a DCI message, the DCI message including one or more fields associated with a secondary cell dormancy indication when the DCI message does not indicate a request for Type 3 HARQ-ACK.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 10 is a diagram illustrating an example process performed, in some aspects, by a user equipment, in accordance with the present disclosure.

FIG. 11 is a diagram illustrating an example process performed, in some aspects, by a user equipment, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
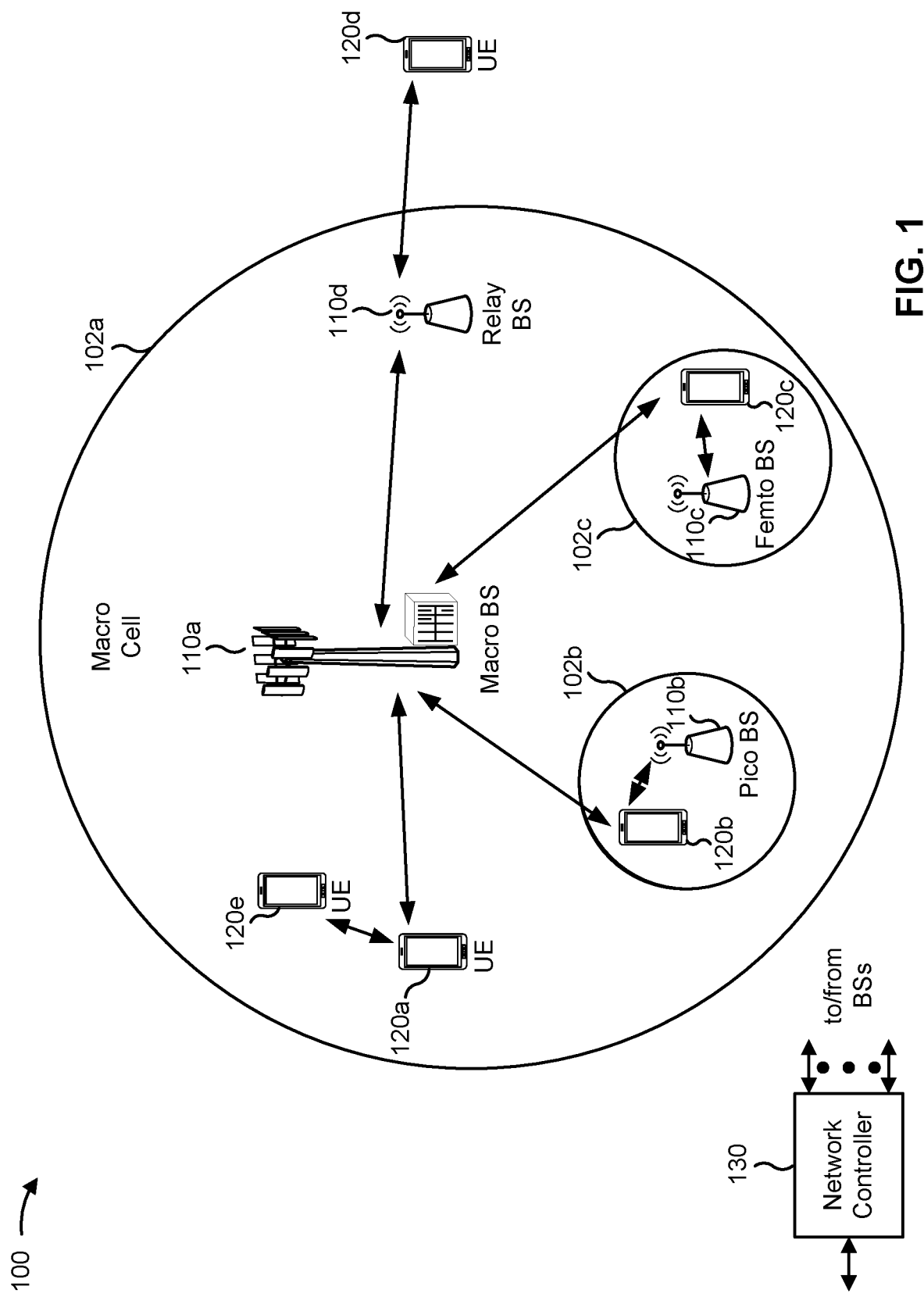
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
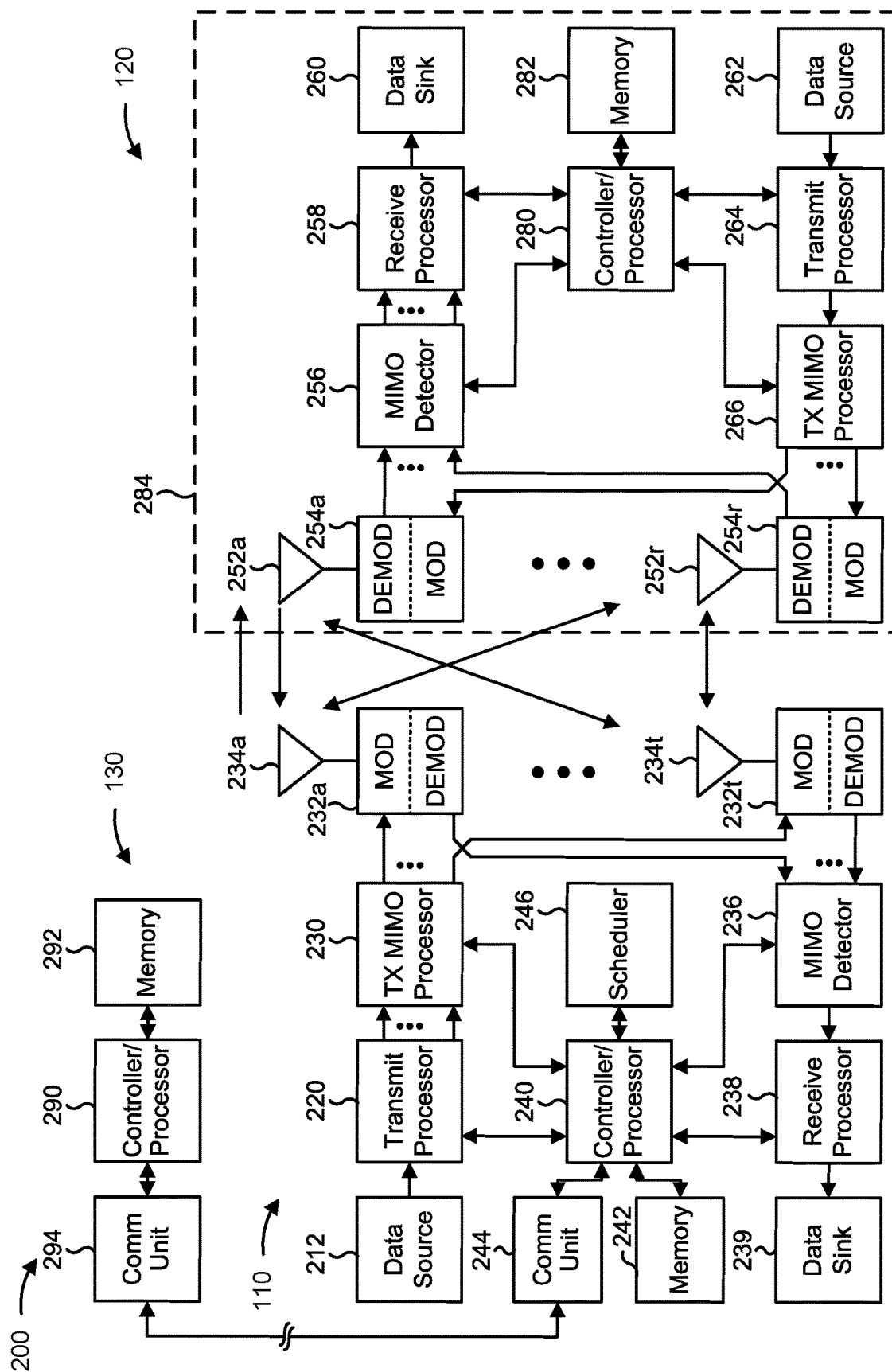
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-11.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-11.

Controller/processor 240 of base station 110, controller/processor 280 of UE 120, and/or any other component(s) of FIG. 2 may perform one or more techniques associated with Type 3 HARQ-ACK, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, the UE includes means for determining, based at least in part on a first field of the DCI message, that the DCI message requests Type 3 HARQ-ACK; or means for determining, from a second field of the DCI message, that the DCI message does not schedule a PDSCH communication based at least in part on a value of the second field of the DCI message comprising: all zeros if resource allocation Type 0 is configured, all ones if resource allocation Type 1 is configured, or all ones or all zeros if both resource allocation Type 0 and resource allocation Type 1 are configured. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining that a CRC of a DCI message is scrambled with a configured scheduling radio network temporary identifier (CS-RNTI); or means for determining whether the DCI message requests Type 3 HARQ-ACK based at least in part on one or more of: the determination that the CRC of the DCI message is scrambled with the CS-RNTI, a value of a one-shot HARQ-ACK request field, a value of a modulation and coding scheme field of the DCI, a value of a frequency domain resource allocation field, or a value of a new data indicator field of the DCI. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining that the DCI message does not request Type 3 HARQ-ACK based at least in part on determining that the CRC of the DCI message is scrambled with CS-RNTI.

In some aspects, the UE includes means for determining that the DCI message requests Type 3 HARQ-ACK based at least in part on the one-shot HARQ-ACK request field indicating a request for Type 3 HARQ-ACK and one or more of the value of the modulation and coding scheme field of the DCI message indicating that the DCI message activates semi-persistent scheduling, or the value of the frequency domain resource allocation field indicating that the DCI message activates semi-persistent scheduling.

In some aspects, the UE includes means for determining that the DCI message does not request Type 3 HARQ-ACK based at least in part on one or more of the value of the modulation and coding scheme field of the DCI message indicating that the DCI releases semi-persistent scheduling, or the value of the frequency domain resource allocation field indicating that the DCI message releases semi-persistent scheduling.

In some aspects, the UE includes means for determining that the DCI message requests Type 3 HARQ-ACK, and means for determining, based at least in part on determining that the DCI message requests Type 3 HARQ-ACK, that the DCI does not release semi-persistent scheduling.

In some aspects, the UE includes means for further comprising: means for determining, based at least in part on determining that the DCI message does not request Type 3 HARQ-ACK, that the DCI releases semi-persistent scheduling.

In some aspects, the UE includes means for determining that the DCI message requests Type 3 HARQ-ACK, and means for determining, based at least in part on determining that the DCI message requests Type 3 HARQ-ACK, to not transmit HARQ-ACK for the DCI message.

In some aspects, the UE includes means for determining that the DCI message requests Type 3 HARQ-ACK based at least in part on the value of the new data indicator field of the DCI message indicating scheduling of a retransmission of a message sent using semi-persistent scheduling.

In some aspects, the UE includes means for determining that the UE is configured to receive a secondary cell dormancy indication via a DCI message; or means for determining whether the DCI message requests Type 3 HARQ-ACK based at least in part on the determination that the UE is configured to receive a secondary cell dormancy indication via the DCI message and one or more of: a value of a one-shot HARQ-ACK request field, or a value of a frequency domain resource allocation field. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining that the DCI message requests Type 3 HARQ-ACK based at least in part on a value of the frequency domain resource allocation field of the DCI message comprising all zeros if resource allocation Type 0 is configured, all ones if resource allocation Type 1 is configured, or all ones or all zeros if both resource allocation Type 0 and resource allocation Type 1 are configured.

In some aspects, the UE includes means for determining that the DCI message requests Type 3 HARQ-ACK and that the DCI does not include the secondary cell dormancy indication based at least in part on a value of a one-shot HARQ-ACK request field being one and a value of the frequency domain resource allocation field of the DCI message comprising all zeros if resource allocation Type 0 is configured, all ones if resource allocation Type 1 is configured, or all ones or all zeros if both resource allocation Type 0 and resource allocation Type 1 are configured.

In some aspects, the UE includes means for determining, based at least in part on the value of the one-shot HARQ-ACK request field, that the DCI message does not request Type 3 HARQ-ACK, and means for determining, based at least in part on determining that the DCI message does not request Type 3 HARQ-ACK, that the DCI message includes the secondary cell dormancy indication.

In some aspects, the UE includes means for determining that the DCI message requests Type 3 HARQ-ACK and that the DCI message includes the secondary cell dormancy indication based at least in part on a value of the one-shot HARQ-ACK request field and a value of the frequency domain resource allocation field of the DCI message comprising all zeros if resource allocation Type 0 is configured, all ones if resource allocation Type 1 is configured, or all ones or all zeros if both resource allocation Type 0 and resource allocation Type 1 are configured.

In some aspects, the UE includes means for determining to not transmit HARQ-ACK for the DCI message based at least in part on the determination that the DCI message requests Type 3 HARQ-ACK and that the DCI message includes the secondary cell dormancy indication.

In some aspects, the user equipment UE includes means for receiving a DCI message, the DCI message including at least a first field and a second field, the first field indicating a request for Type 3 HARQ-ACK, the second field indicating a PDSCH communication is not scheduled when a value of the second field includes: all zeros if resource allocation Type 0 is configured, all ones if resource allocation Type 1 is configured, or all ones or all zeros in a dynamic switch configuration; or means for transmitting the Type 3 HARQ-ACK based at least in part on the DCI message. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving a downlink control information DCI message, the DCI message including one or more fields associated with a secondary cell dormancy indication when the DCI message does not indicate a request for Type 3 HARQ-ACK). The means for the user equipment UE to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
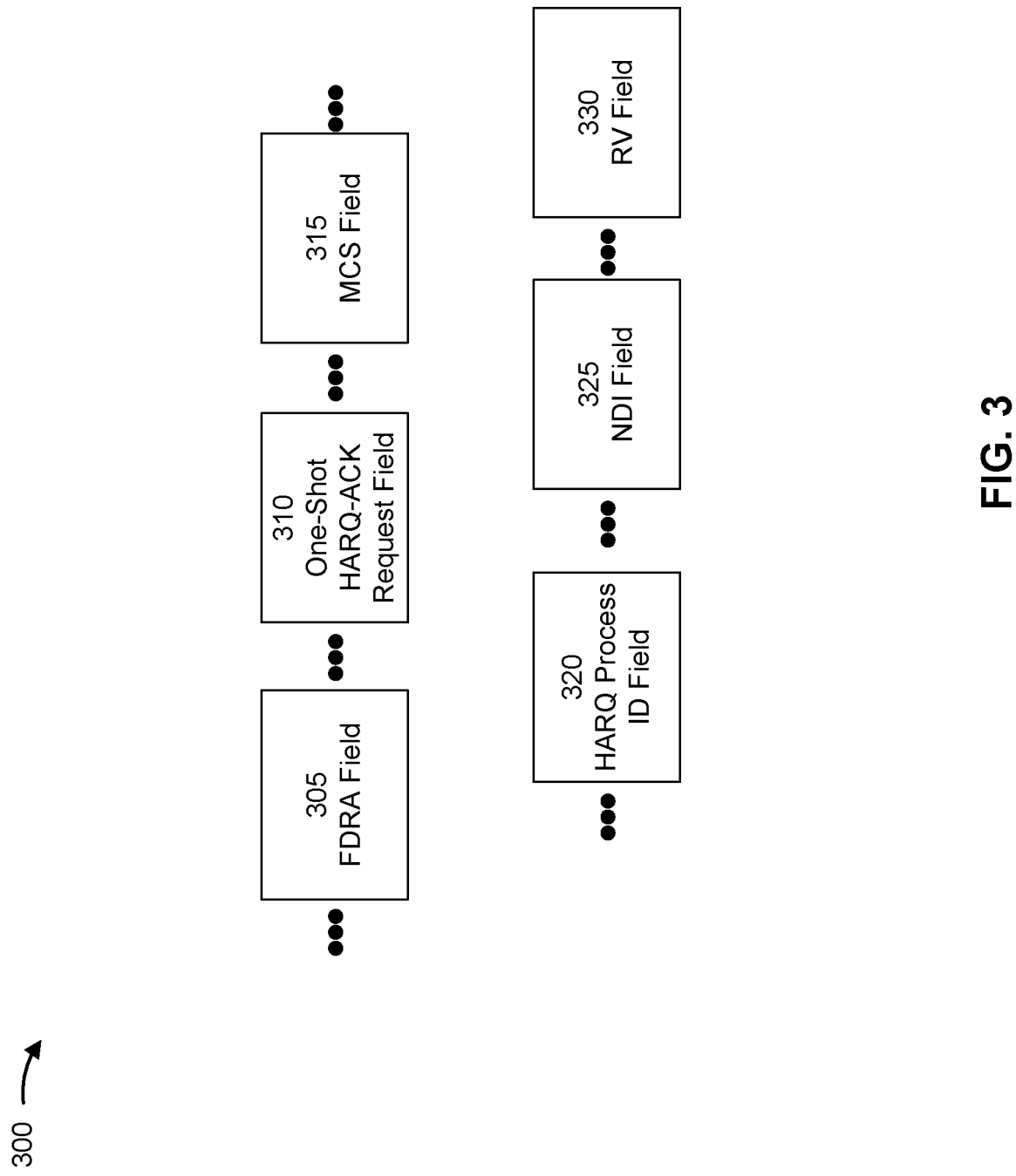
FIG. 3 is a diagram illustrating an example of a downlink control information (DCI) message, in accordance with the present disclosure.

FIG. 3 is a diagram illustrating an example 300 of a DCI message, in accordance with the present disclosure. In some aspects, the example 300 may include a DCI format 1_1 message.

As shown by reference number 305, the DCI message may include a frequency domain resource allocation field (FDRA). The FDRA field may indicate a resource allocation. In some aspects, the FDRA field may have a number of bits that are based at least in part on whether a UE is configured with a resource allocation Type 0, a resource allocation Type 1, or both of the resource allocation Type 0 and the resource allocation Type 1. If both of the resource allocation Type 0 and the resource allocation Type 1 are configured, a most significant bit (e.g., an added bit of the FDRA field) may be used to indicate which of the resource allocation Type 0 and the resource allocation Type 1 are used by the DCI message. When the resource allocation Type 0 or the resource allocation Type 1 are used, a set of least significant bits may indicate the resource allocation.

In some aspects, resource allocation Type 0 may use a resource block group (RBG) based bitmap to allocate resources for a downlink transmission (e.g., using a PDSCH). If resource allocation Type 0 is configured, a value of all zeros for the FDRA field may be an invalid FDRA value for assigning RBGs for a downlink transmission.

In some aspects, resource allocation Type 1 may use a resource index value based bitmap, which indicates a starting resource block and a number of resource blocks for a downlink transmission. If resource allocation Type 1 is configured, a value of all ones for the FDRA field may be an invalid FDRA value for assigning resource blocks for a downlink transmission.

In some aspects, when both of the resource allocation Type 0 and the resource allocation Type 1 are configured, a value of all zeros for the FDRA field and a value of all ones may be invalid FDRA values for assigning resource blocks for a downlink transmission. In some aspects, if the FDRA field has a value of all zeros, the FDRA field indicates that resource allocation Type 0 is used, and the remaining bits having a value of all zeros may be an invalid FDRA value. In some aspects, if the FDRA field has a value of all ones, the FDRA field indicates that resource allocation Type 1 is used, and the remaining bits having a value of all ones may be an invalid FDRA value.

As shown by reference number 310, the DCI message may include a one-shot HARQ-ACK (also referred to as a Type 3 HARQ-ACK) request field. In some aspects, the one-shot HARQ-ACK request field may include a single bit to indicate whether the DCI requests a one-shot HARQ-ACK. In some aspects, a one-shot HARQ-ACK request may indicate that the UE is to transmit HARQ-ACK feedback for one or more (e.g., all) configured HARQ processes for one or more (e.g., all) component carriers over which the UE communicates with a network. In some aspects, a value of 0 may indicate that one-shot HARQ-ACK is not requested and a value of 1 may indicate that one-shot HARQ-ACK is requested. In some aspects, the UE may be configured for one-shot HARQ-ACK (e.g., pdsch-HARQ-ACK-OneShot-Feedback-r16) using radio resource control (RRC) signaling to perform one-shot HARQ-ACK feedback. In some aspects, the HARQ-ACK feedback may include code block group based HARQ-ACK feedback or transport block based HARQ-ACK feedback.

As shown by reference number 315, the DCI message may include an MCS field. The MCS field may indicate an MCS scheme of a PDSCH communication that may be scheduled by the DCI message.

As shown by reference number 320, the DCI message may include a HARQ process identification field (also referred to as a HARQ process ID field or a HARQ process number field). In some aspects, the HARQ process ID field may indicate the processes ID for which PDSCH is scheduled.

As shown by reference number 325, the DCI message may include a new data indicator (NDI) field to indicate whether a PDSCH communication that may be scheduled by the DCI message includes a new transport block or a retransmission of a transport block. In some aspects, the HARQ-ACK feedback may include one or more new data indicators to associate portions of the HARQ-ACK feedback with respective HARQ processes.

As shown by reference number 330, the DCI message may indicate a redundancy version, which may indicate a type of redundancy used to transmit a transport block that may be scheduled by the DCI message.

As indicated above, FIG. 3 is provided as an example. Other examples may differ from what is described with respect to FIG. 3.

In some instances, a base station may transmit a DCI message to request one-shot HARQ-ACK, and may not have a PDSCH communication buffered for transmission to the UE, or may not have available HARQ processes to use for scheduling a PDSCH as all HARQ processes might be occupied and/or pending due to pending HARQ-Ack feedback which has not yet been received by the base station. In these instances, if the base station transmits the DCI message to request one-shot HARQ-ACK, and the UE interprets the DCI message as scheduling a PDSCH communication, the UE may use computing and/or communication resources to attempt to receive a PDSCH communication according to a schedule indicated in the DCI message. If the UE does not receive the PDSCH communication (e.g., because the base station did not transmit the PDSCH communication to the UE), the UE may generate HARQ-ACK feedback to indicate that the UE did not receive the PDSCH communication. This may cause the UE and the base station to be out of synchronization, which may use computing, communication, and/or network resources to detect and/or correct.

In some aspects described herein, a UE (e.g., UE 120) may determine that a DCI message requests Type 3 HARQ-ACK based at least in part on a first field of the DCI message (e.g., a one-shot HARQ-ACK request field). The UE may determine that the DCI message does not schedule a PDSCH communication based at least in part on a value of a second field of the DCI message (e.g., an FDRA field). In some aspects, the UE may determine that the DCI message does not schedule a PDSCH communication based at least in part on a value of the second field being all zeros (e.g., if resource allocation Type 0 is configured), all ones (e.g., if resource allocation Type 1 is configured), or either all zeros or all ones (e.g., if both of resource allocation Type 0 and resource allocation Type 1 are configured). In this way, the base station may transmit the DCI message to request Type 3 HARQ-ACK without scheduling a PDSCH communication, which otherwise may consume computing, communication, and/or network resources, if the base station does not transmit the PDSCH communication, based at least in part on the UE failing to receive the scheduled PDSCH.

In some aspects described herein, a UE (e.g., UE 120) may determine that a CRC of a DCI message is scrambled with a radio network temporary identifier (RNTI) (e.g., a CS-RNTI, a cell RNTI (C-RNTI), or an MCS cell RNTI (MCS-C-RNTI), among other examples). The RNTI may indicate that the DCI message may activate semi-persistent scheduling (SPS), release SPS, or schedule a retransmission of a prior SPS PDSCH communication, among other examples. The UE may determine whether the DCI message requests Type 3 HARQ-ACK based at least in part on a determination that the CRC of the DCI message is scrambled with the CS-RNTI, a value of a one-shot HARQ-ACK request field, a value of an MCS field, a value of an FDRA field, and/or a value of an NDI field, among other examples. In some aspects, the UE may determine that the DCI message does not request Type 3 HARQ-ACK based at least in part on a determination that the CRC of the DCI message is scrambled with the CS-RNTI. In other words, in some aspects, the UE may determine that Type 3 HARQ-ACK is requested only if the CRC of the DCI message is not scrambled with the CS-RNTI (e.g., the CRC is instead scrambled with C-RNTI or MCS-RNTI) and a value of a one-shot HARQ-ACK request field indicates that Type 3 HARQ-ACK is requested.

In some aspects, a UE may determine that the DCI message requests Type 3 HARQ-ACK even if the CRC of the DCI message is scrambled with the CS-RNTI if the DCI either activates a SPS configuration or schedules SPS retransmission. In some aspects, the UE may further determine whether the DCI field indicates to release SPS. In this way, the UE may receive a request for Type 3 HARQ-ACK when using SPS and/or may request Type 3 HARQ-ACK with or without releasing SPS. In some aspects, the DCI message may either release SPS or request Type 3 HARQ-ACK based at least in part on the DCI message having the Type 3 HARQ-ACK request having no acknowledgement or negative acknowledgement (ACK/NACK) bit for the DCI message. In this way, the computing, communication, and/or network resources may be conserved, which may otherwise be consumed to attempt to determine whether the UE received the DCI message to release the SPS.

In some aspects described herein, a UE (e.g., UE 120) may determine that a UE is configured to receive a secondary cell (SCell) dormancy indication (e.g., based at least in part on the UE being configured with SCell dormancy behavior) via a DCI message. The UE may determine whether the DCI message requests Type 3 HARQ-ACK based at least in part on the determination that the UE is configured to receive an SCell dormancy indication and one or more of a value of a one-shot HARQ-ACK request field or a value of an FDRA field. In some aspects, the UE may further determine whether the DCI message includes an SCell dormancy indication. In this way, the UE may receive a DCI message that requests Type 3 HARQ-ACK with or without indicating dormancy for the SCell. In some aspects, the DCI message may either release indicated SCell dormancy or request Type 3 HARQ-ACK based at least in part on the DCI message having the Type 3 HARQ-ACK request having no ACK/NACK bit for the DCI message. In this way, the computing, communication, and/or network resources may be conserved, which may otherwise be consumed to attempt to determine whether the UE received the DCI message to indicate SCell dormancy.

In some aspects, the DCI message may schedule one or more PDSCH communications and/or change a schedule of one or more PDSCH communications, among other examples. In some aspects, the DCI may not schedule a PDSCH communication and/or change a schedule of one or more PDSCH communications, among other examples. If the DCI does not schedule a PDSCH or change a schedule of one or more PDSCH communication, the HARQ process ID field, and/or the NDI field, among other examples may be ignored by the UE.

Figure 4:
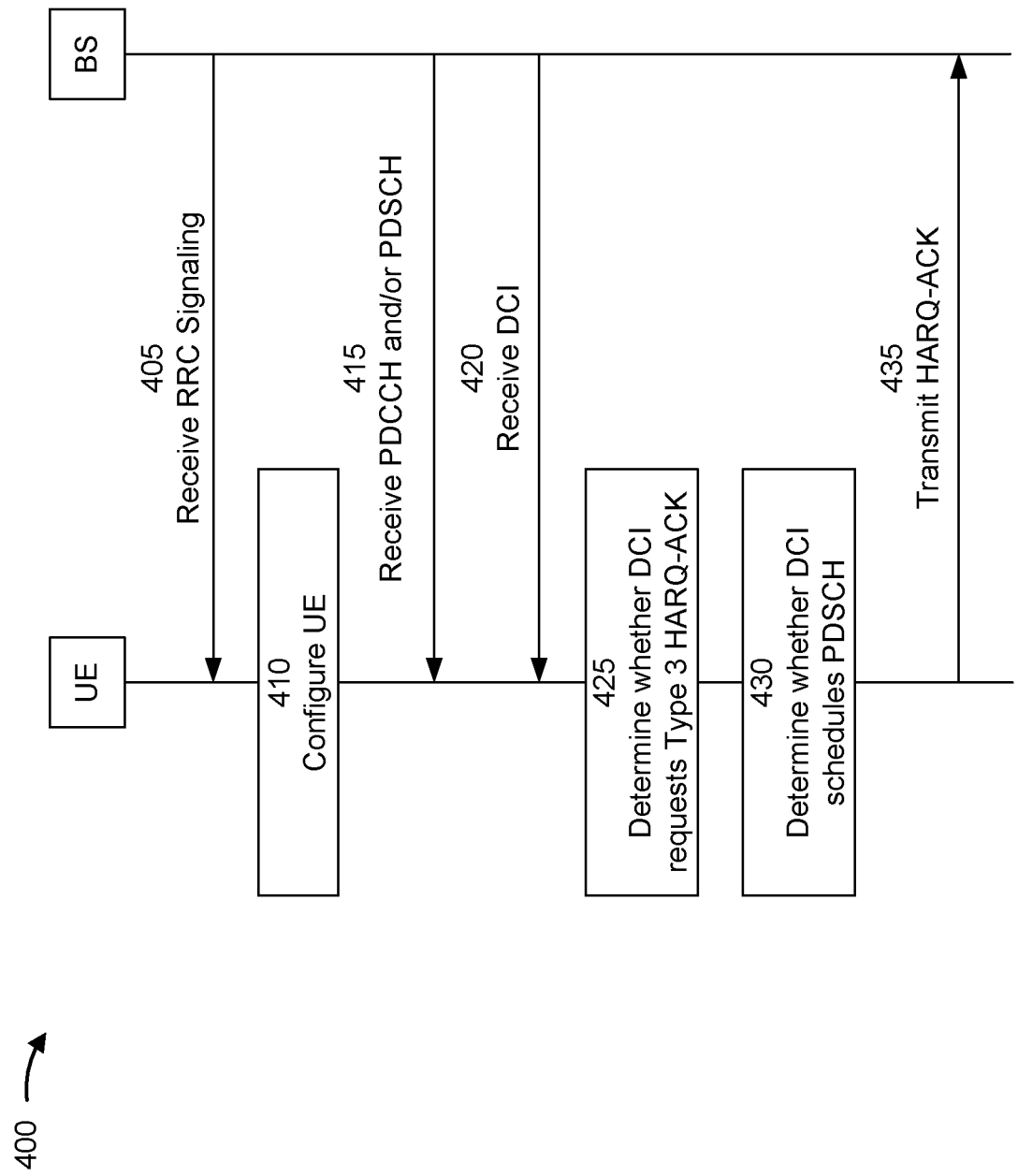
FIG. 4 is a diagram illustrating an example of Type 3 hybrid automatic repeat request (HARQ) acknowledgment (HARQ-ACK), in accordance with the present disclosure.

FIG. 4 is a diagram illustrating an example 400 of Type 3 HARQ-ACK, in accordance with the present disclosure. As shown, a UE (e.g., UE 120) and a base station (e.g., base station 110) communicate using one or more of a PDSCH communication, a physical downlink control channel (PDCCH) communication, and/or a HARQ-ACK transmission, among other examples. In some aspects, the base station and the UE may be part of a wireless network (e.g., the wireless network 100).

As shown in FIG. 4, and by reference number 405, the UE may receive RRC signaling from the base station. In some aspects, the RRC signaling may provide configuration information to enable the UE to receive a DCI message (e.g., a DCI message with a one-shot HARQ-ACK request field). In some aspects, the configuration information may indicate that the UE is to be configured with resource allocation Type 0, resource allocation Type 1, or dynamic resource allocation (e.g., resource allocation Type 0 and resource allocation Type 1).

As shown by reference number 410, the UE may configure the UE based at least in part on the RRC signaling (e.g., including RRC parameter resourceAllocation in pdsch-Config). In some aspects, the UE may configure the UE with resource allocation Type 0, resource allocation Type 1, or a dynamic switching allocation with configurations for resource allocation Type 0 and resource allocation Type 1 (e.g., based at least in part on resourceAllocation set to dynamicswitch).

As shown by reference number 415, the UE may receive one or more communications such as physical downlink control channel (PDCCH) communications and/or PDSCH communications. In some aspects, the UE may determine a HARQ-ACK feedback for the one or more communications. In some aspects, the UE may assign respective HARQ process IDs to the one or more communications. The UE may wait to transmit the HARQ-ACK feedback until the UE receives a request to transmit the HARQ-ACK feedback.

As shown by reference number 420, the UE may receive a DCI message. In some aspects, the base station may transmit the DCI message to allocate resources for a downlink transmission or a downlink transmission, request HARQ feedback, and/or activate or trigger a channel state information measurement, among other examples. The DCI message may be formatted using a format known by the UE, such as a DCI format 1_1 message. The DCI message may include multiple fields, with values of the multiple fields providing one or more indications to the UE.

As shown by reference number 425, the UE may determine whether the DCI requests Type 3 HARQ-ACK feedback. In some aspects, the UE may determine whether the DCI requests Type 3 HARQ-ACK feedback based at least in part on whether the DCI includes a field (e.g., a one-shot HARQ-ACK request field) that indicates a request for Type 3 HARQ-ACK (e.g., with a single bit value of 1).

As shown by reference number 430, the UE may determine whether the DCI message schedules a PDSCH communication. In some aspects, the UE may determine whether the DCI message schedules a PDSCH communication based at least in part on another field (e.g., an FDRA field). In some aspects, the UE may determine that the DCI does not schedule a PDSCH communication based at least in part on the second field having a value of all zeros if resource allocation Type 0 is configured for the UE, all ones if resource allocation Type 1 is configured for the UE, and/or either all ones or all zeros if both resource allocation Type 0 and resource allocation Type 1 are configured (e.g., in a dynamic switch configuration), among other examples. In some aspects, the UE may be configured (e.g., based at least in part on the RRC signaling) to interpret the DCI message to determine whether the DCI message indicates whether Type 3 HARQ-ACK is requested and/or whether the DCI message schedules a PDSCH communication.

In some aspects, the UE may determine that the DCI does not schedule a PDSCH communication based at least in part on a value of all ones or all zeros for a HARQ process identification field of the DCI, a value of all zeros or 1 for a new data indicator field of the DCI, a value of all ones or all zeros for an MCS field of the DCI, and/or a value of all zeros or all ones for a redundancy version field of the DCI, among other examples. In some aspects, the UE may use one or more fields, to determine whether the DCI schedules a PDSCH communication, that would otherwise be ignored if the DCI message does not schedule a PDSCH communication (e.g., the HARQ process ID field and/or the NDI field).

As shown by reference number 435, the UE may transmit a HARQ-ACK based at least in part on the DCI message. In some aspects, the HARQ-ACK may include a Type 3 HARQ-ACK with feedback for multiple HARQ processes for one or more component carriers. In some aspects, the HARQ-ACK may include HARQ feedback for the one or more PDCCH communications, the one or more PDSCH communications, and/or the DCI message, among other examples.

In this way, the base station may transmit a DCI message to request Type 3 HARQ-ACK with or without indicating SCell dormancy. This may conserve computing, communication, and/or network resources that may otherwise be consumed if the base station transmits the DCI with scheduling for a PDSCH communication that the base station does not transmit.

As indicated above, FIG. 4 is provided as an example. Other examples may differ from what is described with respect to FIG. 4.

Figure 5:
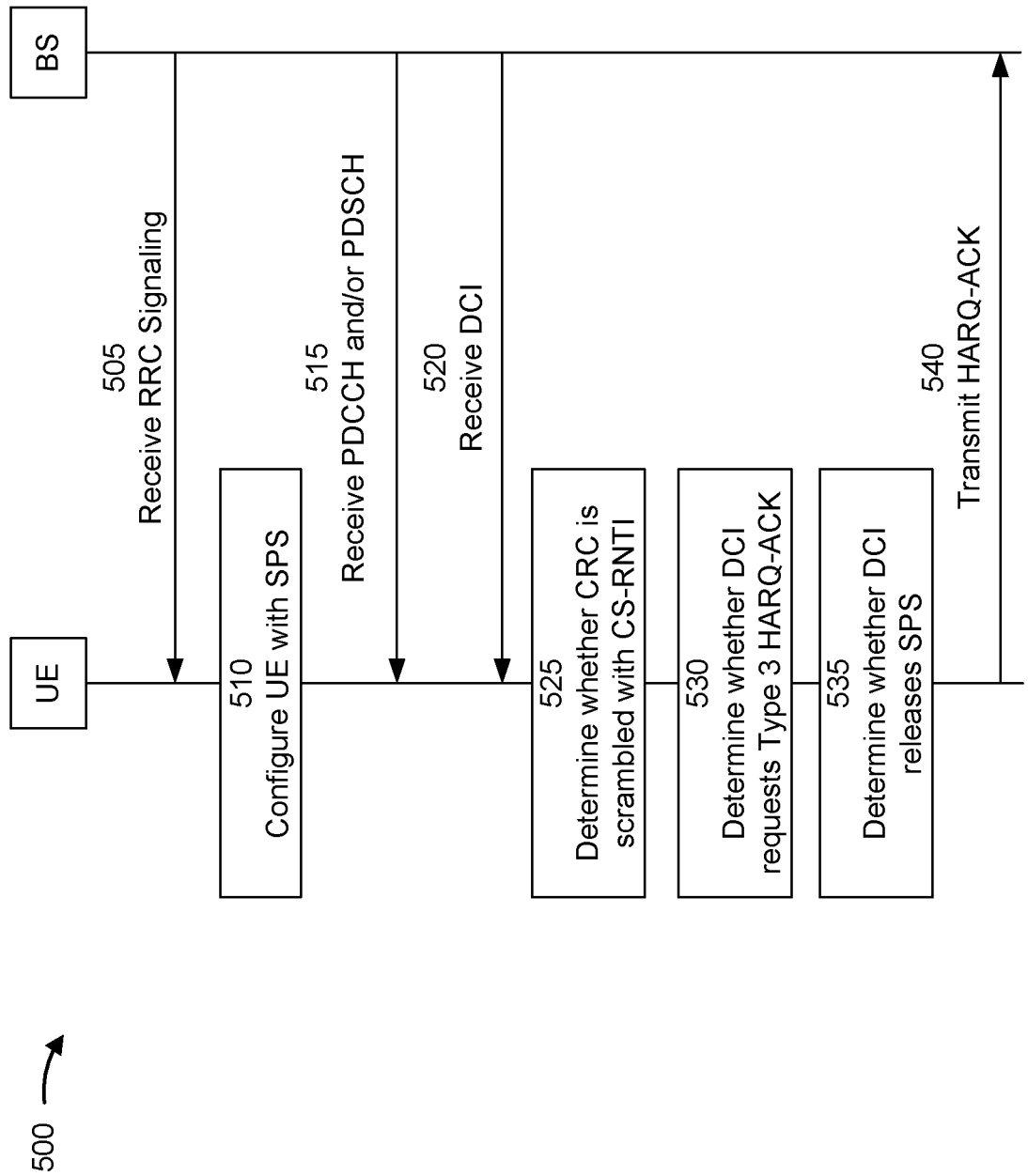
FIG. 5 is a diagram illustrating an example of Type 3 HARQ-ACK, in accordance with the present disclosure.

FIG. 5 is a diagram illustrating an example 500 of Type 3 HARQ-ACK, in accordance with the present disclosure. As shown, a UE (e.g., UE 120) and a base station (e.g., base station 110) communicate using a PDSCH communication, a PDCCH communication, and/or a HARQ-ACK transmission, among other examples. In some aspects, the base station and the UE may be part of a wireless network (e.g., the wireless network 100).

As shown in FIG. 5, and by reference number 505, the UE may receive RRC signaling from the base station. In some aspects, the RRC signaling may provide configuration information to enable the UE to receive a DCI message (e.g., a DCI message with a one-shot HARQ-ACK request field). In some aspects, the RRC signaling may provide configuration information to configure SPS, periodic transmissions, and/or one or more DCI formats, among other examples. In some aspects, the configuration information may indicate that the UE is to be configured with resource allocation Type 0, resource allocation Type 1, or dynamic resource allocation (e.g., resource allocation Type 0 and resource allocation Type 1).

As shown by reference number 510, the UE may configure the UE based at least in part on the RRC signaling (e.g., including RRC parameter resourceAllocation in pdsch-Config). In some aspects, the UE may configure the UE with resource allocation Type 0, resource allocation Type 1, or a dynamic switching allocation with configurations for resource allocation Type 0 and resource allocation Type 1 (e.g., based at least in part on resourceAllocation set to dynamicswitch). In some aspects, the UE may receive an indication (e.g., via DCI) to activate SPS based at least in part on the configuration information.

As shown by reference number 515, the UE may receive one or more communications such as PDCCH communications and/or PDSCH communications. In some aspects, the UE may determine a HARQ-ACK feedback for the one or more communications. In some aspects, the base station may assign respective HARQ process IDs to the one or more communications, e.g. PDSCH communications The UE may wait to transmit the HARQ-ACK feedback until the UE receives a request to transmit the HARQ-ACK feedback.

As shown by reference number 520, the UE may receive a DCI message. In some aspects, the DCI message may include an indication to activate SPS or UL grant Type 2 scheduling, to release SPS or UL grant Type 2 scheduling, and/or to request HARQ-ACK feedback (e.g., Type 3 HARQ-ACK feedback), among other examples.

In some aspects, the DCI message may be used to activate a single DL SPS or single UL grant for Type 2 scheduling. For a DCI format 1_1 message, the DCI message may include a HARQ processes number value of all zeros and a redundancy version value of all zeros for an enabled transport block to activate a single DL SPS or single UL grant for Type 2 scheduling.

In some aspects, the DCI message may be used to release SPS for a single DL SPS or single UL grant Type 2 scheduling. For a DCI format 1_1 message, the DCI message may include a HARQ processes number value of all zeros and a redundancy version value of all zeros, an MCS field value of all ones, and an FDRA value of all zeros if resource allocation Type 0 is configured or all ones if resource allocation Type 1 is configured to release SPS for a single DL SPS or single UL grant Type 2 scheduling.

In some aspects, the DCI message may be used to activate a single DL SPS or a single UL grant Type 2 scheduling when the UE is configured with multiple DL SPS configurations or multiple UL grant Type 2 configurations. For a DCI format 1_1 message, the DCI message may include a redundancy version value of all zeros for an enabled transport block to activate multiple DL SPS or multiple UL grant Type 2 scheduling.

In some aspects, the DCI message may be used to release SPS for multiple DL SPS or multiple UL grant Type 2 scheduling. For a DCI format 1_1 message, the DCI message may include a redundancy version value of all zeros, an MCS value of all ones, and an FDRA value of all zeros if resource allocation Type 0 is configured, or all ones if resource allocation Type 1 is configured.

As shown by reference number 525, the UE may determine whether a CRC of the DCI message is scrambled with a CS-RNTI. In some aspects, if the CRC of the DCI message is scrambled with the CS-RNTI, a one-shot HARQ-ACK field may indicate (e.g., by setting a value of the one-shot HARQ-ACK to zero), and/or the UE may interpret, that a Type 3 HARQ-ACK is not requested.

As shown in reference number 530, the UE may determine whether the DCI message requests Type 3 HARQ-ACK. In some aspects, the DCI message may not request a Type 3 HARQ-ACK if the CRC of the DCI is scrambled with CS-RNTI. In some aspects, the DCI message may request a Type 3 HARQ-ACK if the CRC of the DCI is scrambled with a C-RNTI or an MCS-C-RNTI. In some aspects, the UE may determine whether a Type 3 HARQ-ACK is requested further based at least in part on one or more additional fields of the DCI. In some aspects, the UE may be configured (e.g., based at least in part on the RRC signaling) to interpret the DCI message to determine whether the DCI message indicates whether Type 3 HARQ-ACK is requested and/or whether the DCI message indicates an SPS release.

In some aspects, the UE may determine whether a Type 3 HARQ-ACK is requested based at least in part on the determination that the CRC of the DCI message is scrambled with the CS-RNTI, a value of a one-shot HARQ-ACK request field, a value of an MCS field of the DCI, a value of a frequency domain resource allocation field, and/or a value of a new data indicator field of the DCI, among other examples.

In some aspects, the UE may determine that the DCI message requests Type 3 HARQ-ACK based at least in part on the one-shot HARQ-ACK request field indicating a request for Type 3 HARQ-ACK and the value of the MCS field indicating that the DCI message activates semi-persistent scheduling and/or the value of the FDRA field indicating that the DCI activates semi-persistent scheduling. In some aspects, the UE may determine that the DCI message activates semi-persistent scheduling based at least in part on a value of an NDI field (e.g., all zeros), a value of a redundancy version (e.g., all zeros), and/or either an MCS field is not set to all ones or the FDRA field is not set to all zeros if resource allocation Type 0 is configured, or all ones if resource allocation Type 1 is configured.

In some aspects, the UE may determine that the DCI message requests Type 3 HARQ-ACK based at least in part on the one-shot HARQ-ACK request field indicating a request for Type 3 HARQ-ACK and the value of the NDI field, the redundancy version field, the MCS field, and the FDRA field indicating that the DCI message releases semi-persistent scheduling. In some aspects, if the DCI message releases semi-persistent scheduling, the DCI message may be unable to request Type 3 HARQ-ACK (e.g., the one-shot HARQ-ACK request field may indicate that the DCI message does not request one-shot HARQ-ACK or the UE may interpret the DCI as not requesting one-shot HARQ-ACK).

In some aspects, if the value of the NDI field, the redundancy version field, the MCS field, and the FDRA field indicate that the DCI message releases semi-persistent scheduling, and the one-shot HARQ-ACK request field indicates a request for Type 3 HARQ-ACK, the UE may interpret the DCI as requesting a Type 3 HARQ-ACK and not an SPS release. In other words, in some aspects, for a DCI message to release SPS, the one-shot HARQ-ACK request field must indicate that the DCI does not request Type 3 HARQ-ACK.

In some aspects, if the DCI requests Type 3 HARQ-ACK, the UE may not transmit HARQ-ACK to confirm reception of a DCI that indicates an SPS release.

In some aspects, a DCI that schedules a retransmission of an SPS communication (e.g., if NDI has a value of one) may also request Type 3 HARQ-ACK.

As shown by reference number 535, the UE may determine whether the DCI message releases SPS. In some aspects, the UE may determine whether the DCI message releases SPS based at least in part on determining whether the DCI message requests Type 3 HARQ-ACK, as discussed above. In some aspects, one or more fields of the DCI message may indicate whether the DCI message releases SPS. Based at least in part on determining whether the DCI message releases SPS, the UE may communicate (e.g., transmit and/or receive communications) via resources associated with the SPS or may cease communications via the resources associated with the SPS.

As shown by reference number 540, the UE may transmit a HARQ-ACK based at least in part on the DCI message. In some aspects, the HARQ-ACK may include a Type 3 HARQ-ACK with feedback for multiple HARQ processes for one or more component carriers. In some aspects, the HARQ-ACK may include HARQ feedback for the one or more PDCCH communications, the one or more PDSCH communications, and/or the DCI message, among other examples.

In this way, the base station may transmit a DCI message to request Type 3 HARQ-ACK while using SPS and/or may request Type 3 HARQ-ACK with or without releasing SPS. In some aspects, the DCI message may either release SPS or request Type 3 HARQ-ACK based at least in part on the DCI message having the Type 3 HARQ-ACK request having no ACK/NACK bit for the DCI message. In this way, the computing, communication, and/or network resources may be conserved, which may otherwise be consumed to attempt to determine whether the UE received the DCI message to release the SPS.

As indicated above, FIG. 5 is provided as an example. Other examples may differ from what is described with respect to FIG. 5.

Figure 6:
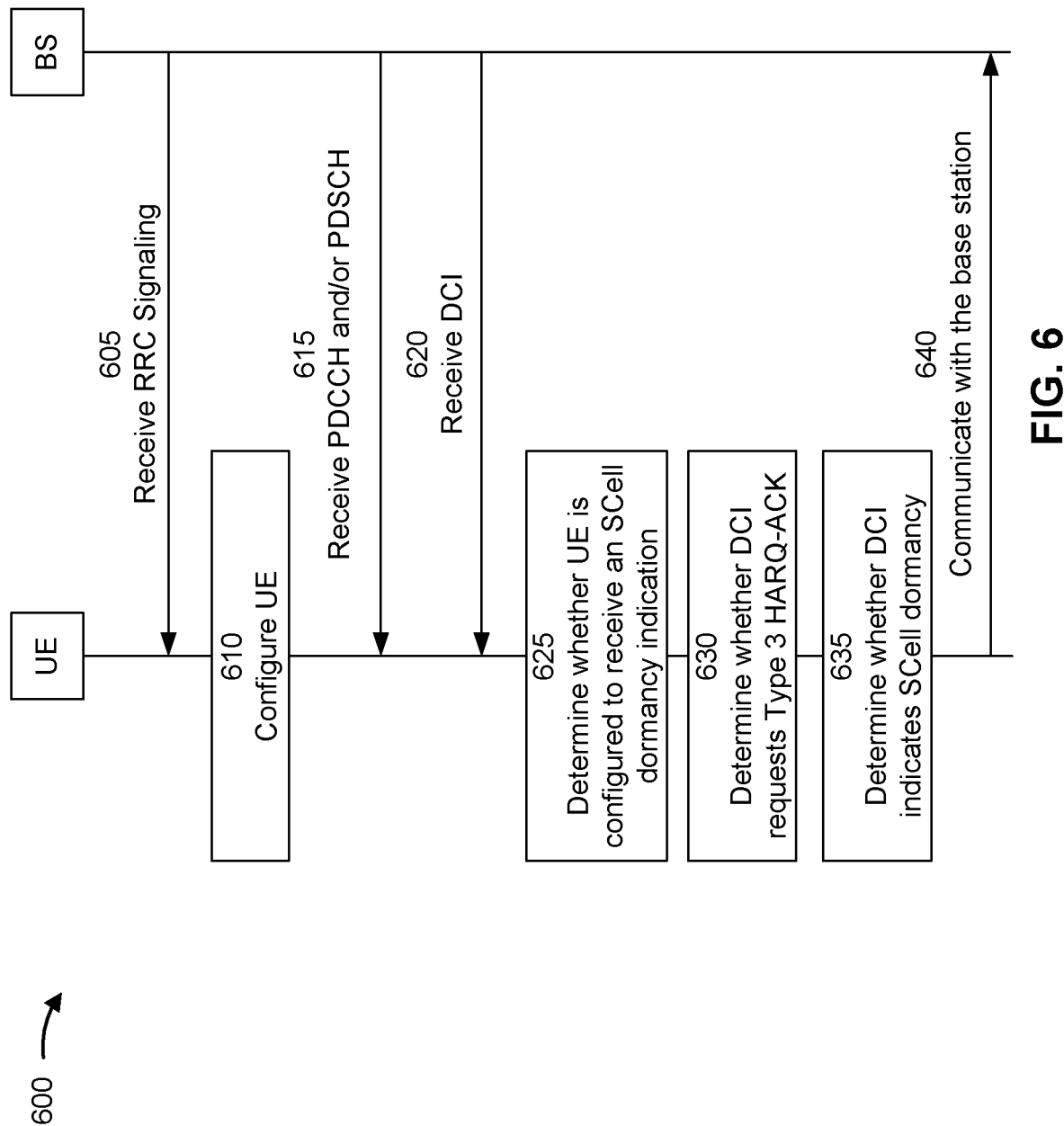
FIG. 6 is a diagram illustrating an example of Type 3 HARQ-ACK, in accordance with the present disclosure.

FIG. 6 is a diagram illustrating an example 600 of Type 3 HARQ-ACK, in accordance with the present disclosure. As shown, a UE (e.g., UE 120) and a base station (e.g., base station 110) communicate using one or more of a PDSCH communication, a PDCCH communication, and/or a HARQ-ACK transmission, among other examples. In some aspects, the base station and the UE may be part of a wireless network (e.g., the wireless network 100).

As shown by reference number 605, the UE may receive RRC signaling from the base station. In some aspects, the RRC signaling may provide configuration information to enable the UE to receive a DCI message (e.g., a DCI message with a one-shot HARQ-ACK request field). In some aspects, the RRC signaling may provide configuration information to configure dormancy behavior, such as a dormant mode or a non-dormant mode, among other examples. In some aspects, the configuration information may indicate that the UE is to be configured with resource allocation Type 0, resource allocation Type 1, or dynamic resource allocation (e.g., resource allocation Type 0 and resource allocation Type 1).

As shown by reference number 610, the UE may configure the UE based at least in part on the RRC signaling (e.g., including RRC parameter resourceAllocation in pdsch-Config). In some aspects, the UE may configure the UE with resource allocation Type 0, resource allocation Type 1, or a dynamic switching allocation with configurations for resource allocation Type 0 and resource allocation Type 1 (e.g., based at least in part on resourceAllocation set to dynamicswitch).

In some aspects, the UE may be configured to support dynamic switching of an activated SCell between dormancy and non-dormancy. When the SCell is in dormancy, UE activities may be reduced to conserve power of the UE. When the SCell is in non-dormancy, the UE may actively communicate with the base station via the SCell. In some aspects, the UE may be configured to receive DCI that schedules PDSCH communications and provides an SCell dormancy indication. In some aspects, the UE may be configured to receive DCI that provides an SCell dormancy indication without also scheduling PDSCH communications.

As shown by reference number 615, the UE may receive one or more communications such as PDCCH communications and/or PDSCH communications. In some aspects, the UE may determine a HARQ-ACK feedback for the one or more communications. In some aspects, the UE may assign respective HARQ process IDs to the one or more communications. The UE may wait to transmit the HARQ-ACK feedback until the UE receives a request to transmit the HARQ-ACK feedback.

As shown by reference number 620, the UE may receive a DCI message. In some aspects, the base station may transmit the DCI message to allocate resources for a downlink transmission or a downlink transmission, request HARQ feedback, activate or trigger a channel state information measurement, and/or indicate dormancy for an SCell, among other examples. The DCI message may be formatted using a format known by the UE, such as a DCI format 1_1 message.

In some aspects, the UE may be configured with one-shot HARQ-ACK (e.g., based at least in part on RRC parameter pdsch-HARQ-ACK-OneShotFeedback-r16) and with SCell dormancy behavior (e.g., based at least in part on RRC parameter dormant-BWP or by first-non-dormant-BWP-ID-for-DCI-inside-active-time for an activated SCell). In some aspects, the DCI message (e.g., a DCI format 1_1 message), may indicate whether Type 3 HARQ-ACK is requested.

As shown by reference number 625, the UE may determine whether the UE is configured to receive an SCell dormancy indication. In some aspects, the UE may be configured to receive the SCell dormancy indication based at least in part on configuration information (e.g., received via the RRC signaling). The configuration information may configure the UE with one or more SCells for communication with the base station and/or one or more additional base stations. In some aspects, the UE may be configured to receive the SCell dormancy indication when the UE is in SCell active time (e.g., SCell non-dormancy) to indicate that the UE is to initiate SCell dormancy (e.g., to configure the one or more SCells as dormant).

As shown by reference number 630, the UE may determine whether the DCI message requests Type 3 HARQ-ACK. In some aspects, the UE may determine whether the DCI message requests Type 3 HARQ-ACK based at least in part on the determination that the UE is configured to receive an SCell dormancy indication via the DCI message and one or more of a value of a one-shot HARQ-ACK request field, or a value of an FDRA field. In some aspects, the UE may be configured (e.g., based at least in part on the RRC signaling) to interpret the DCI message to determine whether the DCI message indicates whether Type 3 HARQ-ACK is requested and/or whether the DCI message indicates SCell dormancy.

In some aspects, the UE may determine that the DCI message requests Type 3 HARQ-ACK based at least in part on a value of the FDRA field of the DCI message comprising all zeros if resource allocation Type 0 is configured, all ones if resource allocation Type 1 is configured, or all ones or all zeros if both resource allocation Type 0 and resource allocation Type 1 are configured.

In some aspects, the UE may determine that the DCI message requests Type 3 HARQ-ACK and that the DCI does not include the SCell dormancy indication based at least in part on a value of a one-shot HARQ-ACK request field indicating the Type 3 HARQ-ACK is requested (e.g., the value of the one-shot HARQ-ACK field being one) and a value of the FDRA field of the DCI message comprising all zeros if resource allocation Type 0 is configured, all ones if resource allocation Type 1 is configured, or all ones or all zeros if both resource allocation Type 0 and resource allocation Type 1 are configured.

In some aspects, the UE may determine, based at least in part on the value of the one-shot HARQ-ACK request field, that the DCI message does not request Type 3 HARQ-ACK. The UE may further determine, based at least in part on determining that the DCI message does not request Type 3 HARQ-ACK, that the DCI message includes the SCell dormancy indication.

In some aspects, the UE may determine that the DCI message requests Type 3 HARQ-ACK and that the DCI message includes the secondary cell dormancy indication based at least in part on a value of the one-shot HARQ-ACK request field and/or based at least in part on a value of the FDRA field of the DCI message comprising all zeros if resource allocation Type 0 is configured, all ones if resource allocation Type 1 is configured, or all ones or all zeros if both resource allocation Type 0 and resource allocation Type 1 are configured.

As shown by reference number 635, the UE may determine whether the DCI message indicates SCell dormancy based at least in part on determining whether the DCI message requests Type 3 HARQ-ACK, as discussed above. In some aspects, one or more fields of the DCI message indicate whether the DCI message indicates SCell dormancy. Based at least in part on determining whether the DCI message indicates SCell dormancy, the UE may communicate via one or more SCells or may cease communication via the SCells.

As show by reference number 640, the UE may communicate with the base station based at least in part on the DCI message. For example, the UE may transmit a HARQ-ACK to the base station and/or the UE may communicate via one or more SCells. In some aspects, the HARQ-ACK may include a Type 3 HARQ-ACK with feedback for multiple HARQ processes for one or more component carriers. In some aspects, the HARQ-ACK may include HARQ feedback for the one or more PDCCH communications, the one or more PDSCH communications, and/or the DCI message, among other examples. In some aspects, the UE may determine to not transmit HARQ-ACK for the DCI message based at least in part on the determination that the DCI message requests Type 3 HARQ-ACK and that the DCI message includes the SCell dormancy indication.

In some aspects, the DCI message may either release indicated SCell dormancy or request Type 3 HARQ-ACK based at least in part on the DCI message having the Type 3 HARQ-ACK request having no ACK/NACK bit for the DCI message. In this way, the computing, communication, and/or network resources may be conserved, which may otherwise be consumed to attempt to determine whether the UE received the DCI message to indicate SCell dormancy.

As indicated above, FIG. 6 is provided as an example. Other examples may differ from what is described with respect to FIG. 6.

Figure 7:
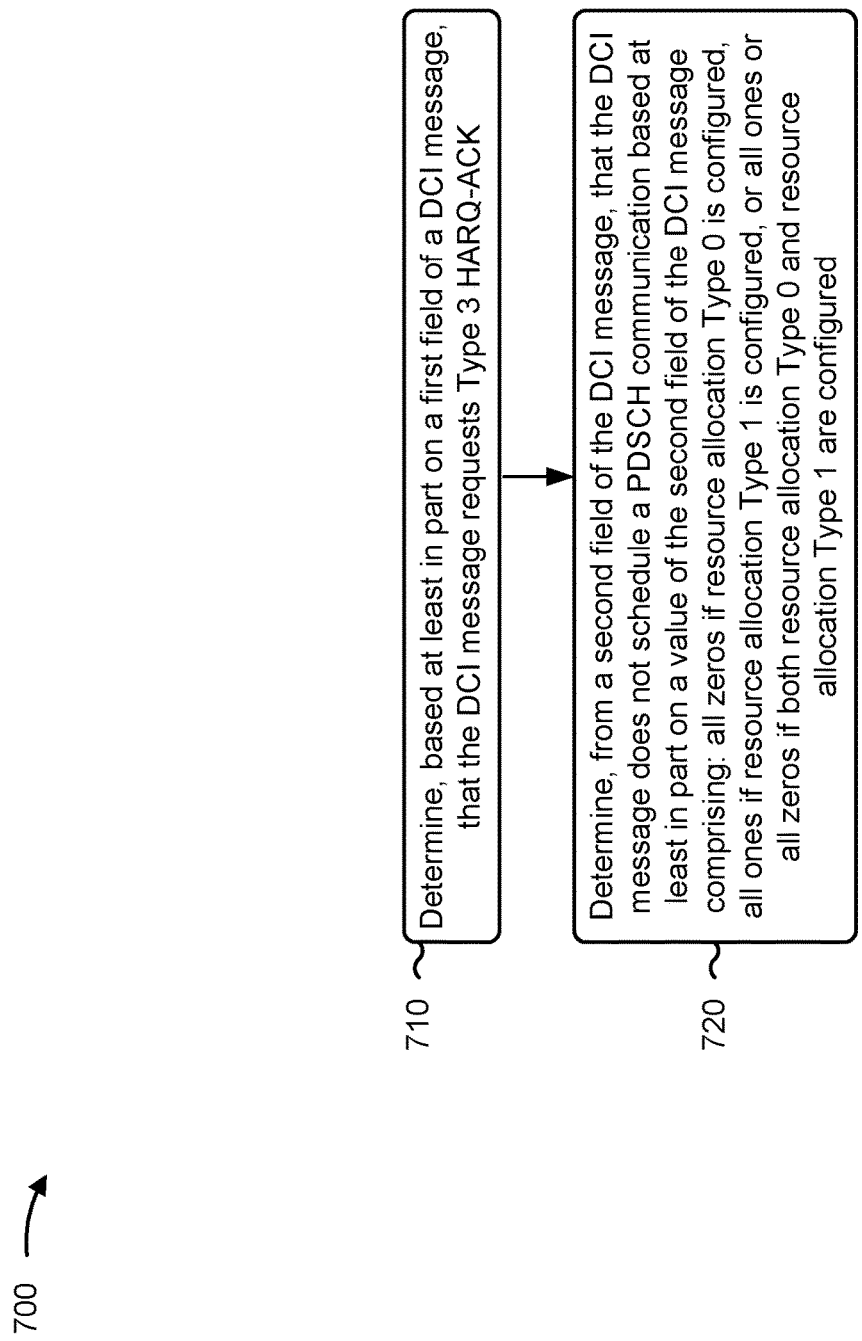
FIG. 7 is a diagram illustrating an example process performed, in some aspects, by a user equipment, in accordance with the present disclosure.

FIG. 7 is a diagram illustrating an example process 700 performed, in some aspects, by a UE, in accordance with the present disclosure. Example process 700 is an example where the UE (e.g., UE 120, among other examples) performs operations associated with Type 3 HARQ-ACK.

As shown in FIG. 7, in some aspects, process 700 may include determining, based at least in part on a first field of the DCI message, that the DCI message requests Type 3 HARQ-ACK (block 710). In some aspects, the UE (e.g., using controller/processor 280, among other examples) may determine, based at least in part on a first field of the DCI message, that the DCI message requests Type 3 HARQ-ACK, as described above.

As further shown in FIG. 7, in some aspects, process 700 may include determining, from a second field of the DCI message, that the DCI message does not schedule a PDSCH communication based at least in part on a value of the second field of the DCI message comprising all zeros if resource allocation Type 0 is configured, all ones if resource allocation Type 1 is configured, or all ones or all zeros if both resource allocation Type 0 and resource allocation Type 1 are configured (block 720). In some aspects, the UE (e.g., using controller/processor 280, among other examples) may determine, from a second field of the DCI message, that the DCI message does not schedule a PDSCH communication based at least in part on a value of the second field of the DCI message comprising all zeros if resource allocation Type 0 is configured, all ones if resource allocation Type 1 is configured, or all ones or all zeros if both resource allocation Type 0 and resource allocation Type 1 are configured, as described above.

Process 700 may include additional aspects, such as any single aspect or any combination of aspects described below and/or in connection with one or more other processes described elsewhere herein.

In a first aspect, the first field comprises a one-shot HARQ-ACK request field.

In a second aspect, alone or in combination with the first aspect, the second field comprises a frequency domain resource allocation field.

In a third aspect, alone or in combination with one or more of the first and second aspects, the UE is configured with one or more of resource allocation Type 0 or resource allocation Type 1 based at least in part on RRC signaling.

In a fourth aspect, alone or in combination with one or more of the first through third aspects, determining that the DCI message does not schedule the PDSCH communication is further based at least in part on one or more of a value of all ones or all zeros for a HARQ process identification field of the DCI, a value of all zeros or 1 for a new data indicator field of the DCI, a value of all ones or all zeros for an MCS field of the DCI, or a value of all zeros or all ones for a redundancy version field of the DCI.

In a fifth aspect, alone or in combination with one or more of the first through fourth aspects, process 700 includes determining that a CRC of the DCI message is scrambled with a radio network temporary identifier (RNTI), wherein determining that the DCI message requests Type 3 HARQ-ACK, determining that the DCI message does not schedule the PDSCH communication, or a combination thereof is based at least in part on the determination that the CRC of the DCI message is scrambled with the RNTI.

In a sixth aspect, alone or in combination with one or more of the first through fifth aspects, the RNTI comprises a cell RNTI or a modulation and coding scheme cell RNTI.

In a seventh aspect, alone or in combination with one or more of the first through sixth aspects, determining that the DCI message requests Type 3 HARQ-ACK is based at least in part on the first field of the DCI message indicating a request for Type 3 HARQ-ACK and one or more of a value of a modulation and coding scheme field of the DCI message indicating that the DCI message activates semi-persistent scheduling, or a value of the second field of the DCI message indicating that the DCI message activates semi-persistent scheduling.

In an eighth aspect, alone or in combination with one or more of the first through seventh aspects, process 700 includes determining, based at least in part on determining that the DCI message requests Type 3 HARQ-ACK, that the DCI does not release semi-persistent scheduling.

In a ninth aspect, alone or in combination with one or more of the first through eighth aspects, process 700 includes determining, based at least in part on determining that the DCI message requests Type 3 HARQ-ACK, to not transmit HARQ-ACK for the DCI message.

In a tenth aspect, alone or in combination with one or more of the first through ninth aspects, determining that the DCI message requests Type 3 HARQ-ACK is based at least in part on a value of a new data indicator field of the DCI message indicating scheduling of a retransmission of a message sent using semi-persistent scheduling.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
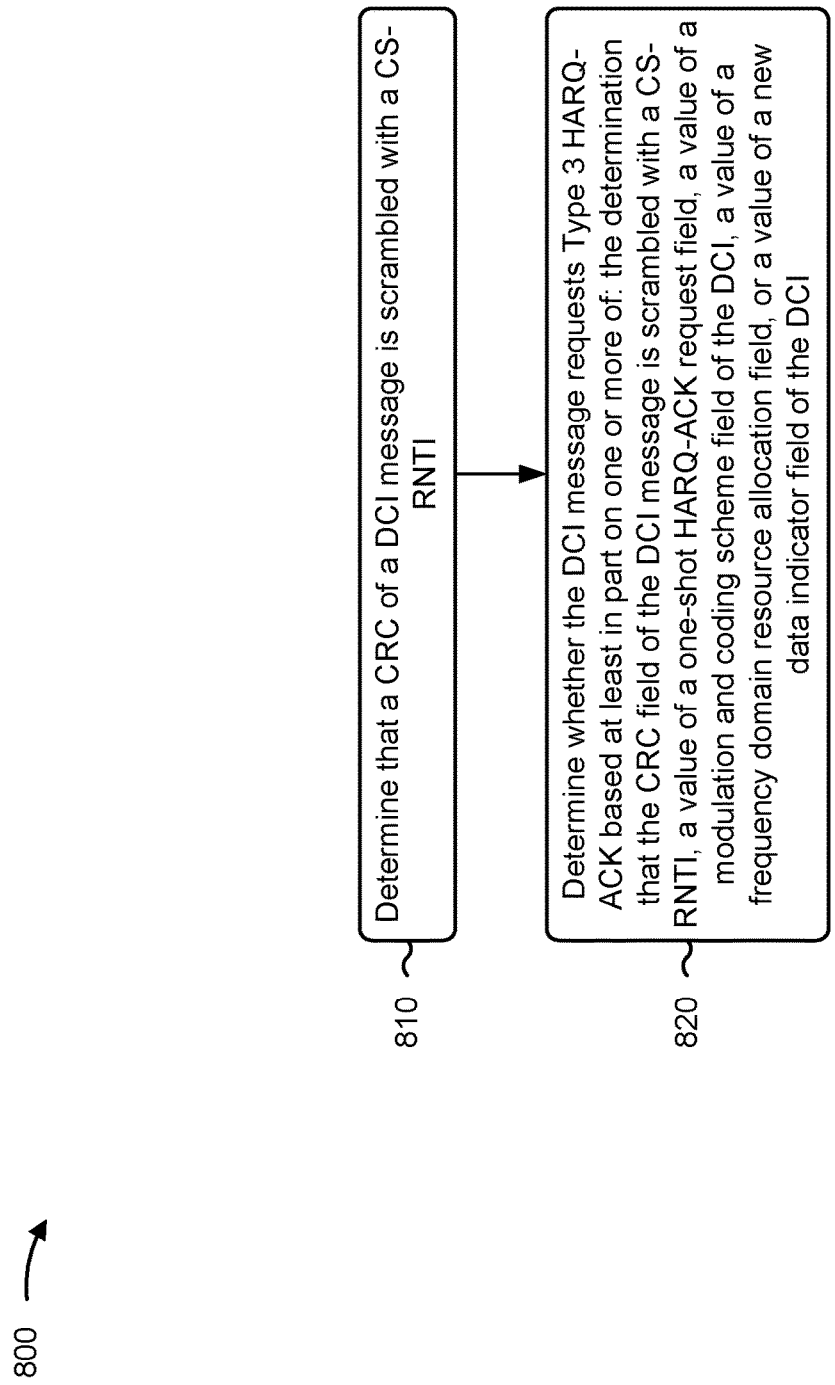
FIG. 8 is a diagram illustrating an example process performed, in some aspects, by a user equipment, in accordance with the present disclosure.

FIG. 8 is a diagram illustrating an example process 800 performed, in some aspects, by a UE, in accordance with the present disclosure. Example process 800 is an example where the UE (e.g., UE 120, among other examples) performs operations associated with Type 3 HARQ-ACK.

As shown in FIG. 8, in some aspects, process 800 may include determining that a CRC of a DCI message is scrambled with a CS-RNTI (block 810). In some aspects, the UE (e.g., using controller/processor 280, among other examples) may determine that a CRC of a DCI message is scrambled with a CS-RNTI, as described above.

As further shown in FIG. 8, in some aspects, process 800 may include determining whether the DCI message requests Type 3 HARQ-ACK based at least in part on one or more of the determination that the CRC of the DCI message is scrambled with the CS-RNTI, a value of a one-shot HARQ-ACK request field, a value of an MCS field of the DCI, a value of a frequency domain resource allocation field, or a value of a new data indicator field of the DCI (block 820). In some aspects, the UE (e.g., using controller/processor 280, among other examples) may determine whether the DCI message requests Type 3 HARQ-ACK based at least in part on one or more of the determination that the CRC of the DCI message is scrambled with the CS-RNTI, a value of a one-shot HARQ-ACK request field, a value of an MCS field of the DCI, a value of a frequency domain resource allocation field, or a value of a new data indicator field of the DCI, as described above.

Process 800 may include additional aspects, such as any single aspect or any combination of aspects described below and/or in connection with one or more other processes described elsewhere herein.

In a first aspect, determining whether the DCI message requests Type 3 HARQ-ACK comprises determining that the DCI message does not request Type 3 HARQ-ACK based at least in part on determining that the CRC of the DCI message is scrambled with CS-RNTI.

In a second aspect, alone or in combination with the first aspect, determining whether the DCI message requests Type 3 HARQ-ACK comprises determining that the DCI message requests Type 3 HARQ-ACK based at least in part on the one-shot HARQ-ACK request field indicating a request for Type 3 HARQ-ACK and one or more of the value of the modulation and coding scheme field of the DCI message indicating that the DCI message activates semi-persistent scheduling, or the value of the frequency domain resource allocation field indicating that the DCI message activates semi-persistent scheduling.

In a third aspect, alone or in combination with one or more of the first and second aspects, determining whether the DCI message requests Type 3 HARQ-ACK comprises determining that the DCI message does not request Type 3 HARQ-ACK based at least in part on one or more of the value of the modulation and coding scheme field of the DCI message indicating that the DCI releases semi-persistent scheduling, or the value of the frequency domain resource allocation field indicating that the DCI message activates semi-persistent scheduling.

In a fourth aspect, alone or in combination with one or more of the first through third aspects, determining whether the DCI message requests Type 3 HARQ-ACK comprises determining that the DCI message requests Type 3 HARQ-ACK, and determining, based at least in part on determining that the DCI message requests Type 3 HARQ-ACK, that the DCI does not release semi-persistent scheduling.

In a fifth aspect, alone or in combination with one or more of the first through fourth aspects, determining whether the DCI message requests Type 3 HARQ-ACK comprises determining that the DCI message does not request Type 3 HARQ-ACK and process 800 further comprises determining, based at least in part on determining that the DCI message does not request Type 3 HARQ-ACK, that the DCI releases semi-persistent scheduling.

In a sixth aspect, alone or in combination with one or more of the first through fifth aspects, determining whether the DCI message requests Type 3 HARQ-ACK comprises determining that the DCI message requests Type 3 HARQ-ACK, and determining, based at least in part on determining that the DCI message requests Type 3 HARQ-ACK, to not transmit HARQ-ACK for the DCI message.

In a seventh aspect, alone or in combination with one or more of the first through sixth aspects, determining whether the DCI message requests Type 3 HARQ-ACK comprises determining that the DCI message requests Type 3 HARQ-ACK based at least in part on the value of the new data indicator field of the DCI message indicating scheduling of a retransmission of a message sent using semi-persistent scheduling.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
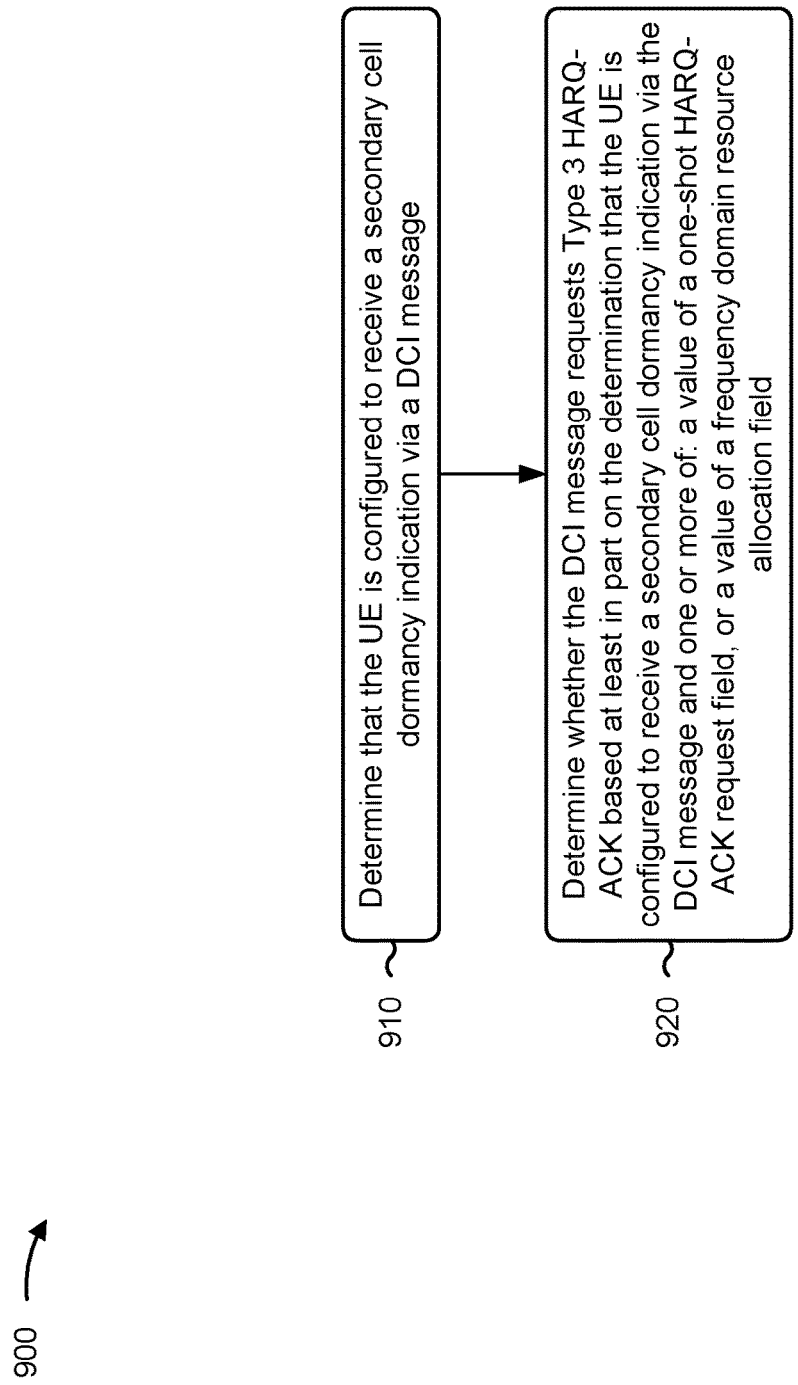
FIG. 9 is a diagram illustrating an example process performed, in some aspects, by a user equipment, in accordance with the present disclosure.

FIG. 9 is a diagram illustrating an example process 900 performed, in some aspects, by a UE, in accordance with the present disclosure. Example process 900 is an example where the UE (e.g., UE 120, among other examples) performs operations associated with Type 3 HARQ-ACK.

As shown in FIG. 9, in some aspects, process 900 may include determining that the UE is configured to receive a secondary cell dormancy indication via a DCI message (block 910). In some aspects, the UE (e.g., using controller/processor 280, among other examples) may determine that the UE is configured to receive a secondary cell dormancy indication via a DCI message, as described above.

As further shown in FIG. 9, in some aspects, process 900 may include determining whether the DCI message requests Type 3 HARQ-ACK based at least in part on the determination that the UE is configured to receive a secondary cell dormancy indication via the DCI message and one or more of: a value of a one-shot HARQ-ACK request field, or a value of a frequency domain resource allocation field (block 920). In some aspects, the UE (e.g., using controller/processor 280, among other examples) may determine whether the DCI message requests Type 3 HARQ-ACK based at least in part on the determination that the UE is configured to receive a secondary cell dormancy indication via the DCI message and one or more of: a value of a one-shot HARQ-ACK request field, or a value of a frequency domain resource allocation field, as described above.

Process 900 may include additional aspects, such as any single aspect or any combination of aspects described below and/or in connection with one or more other processes described elsewhere herein.

In a first aspect, determining whether the DCI message requests Type 3 HARQ-ACK comprises determining that the DCI message requests Type 3 HARQ-ACK based at least in part on a value of the frequency domain resource allocation field of the DCI message comprising all zeros if resource allocation Type 0 is configured, all ones if resource allocation Type 1 is configured, or all ones or all zeros if both resource allocation Type 0 and resource allocation Type 1 are configured.

In a second aspect, alone or in combination with the first aspect, determining whether the DCI message requests Type 3 HARQ-ACK comprises determining that the DCI message requests Type 3 HARQ-ACK and that the DCI does not include the secondary cell dormancy indication based at least in part on a value of a one-shot HARQ-ACK request field being one and a value of the frequency domain resource allocation field of the DCI message comprising all zeros if resource allocation Type 0 is configured, all ones if resource allocation Type 1 is configured, or all ones or all zeros if both resource allocation Type 0 and resource allocation Type 1 are configured.

In a third aspect, alone or in combination with one or more of the first and second aspects, determining whether the DCI message requests Type 3 HARQ-ACK comprises determining, based at least in part on the value of the one-shot HARQ-ACK request field, that the DCI message does not request Type 3 HARQ-ACK, and determining, based at least in part on determining that the DCI message does not request Type 3 HARQ-ACK, that the DCI message includes the secondary cell dormancy indication.

In a fourth aspect, alone or in combination with one or more of the first through third aspects, determining whether the DCI message requests Type 3 HARQ-ACK comprises determining that the DCI message requests Type 3 HARQ-ACK and that the DCI message includes the secondary cell dormancy indication based at least in part on a value of the one-shot HARQ-ACK request field and a value of the frequency domain resource allocation field of the DCI message comprising all zeros if resource allocation Type 0 is configured, all ones if resource allocation Type 1 is configured, or all ones or all zeros if both resource allocation Type 0 and resource allocation Type 1 are configured.

In a fifth aspect, alone or in combination with one or more of the first through fourth aspects, process 900 includes determining to not transmit HARQ-ACK for the DCI message based at least in part on the determination that the DCI message requests Type 3 HARQ-ACK and that the DCI message includes the secondary cell dormancy indication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a UE, in accordance with various aspects of the present disclosure. Example process 1000 is an example where the UE (e.g., UE 120) performs operations associated with type 3 HARQ-ACK.

As shown in FIG. 10, in some aspects, process 1000 may include receiving a DCI message, the DCI message including at least a first field and a second field, the first field indicating a request for Type 3 HARQ-ACK, the second field indicating a PDSCH communication is not scheduled when a value of the second field includes: all zeros if resource allocation Type 0 is configured, all ones if resource allocation Type 1 is configured, or all ones or all zeros in a dynamic switch configuration (block 1010). For example, the UE (e.g., using antenna 252, DEMOD 254, MIMO detector 256, receive processor 258, controller/processor 280, and/or the like) may receive a DCI message, the DCI message including at least a first field and a second field, the first field indicating a request for Type 3 HARQ-ACK, the second field indicating a PDSCH communication is not scheduled when a value of the second field includes: all zeros if resource allocation Type 0 is configured, all ones if resource allocation Type 1 is configured, or all ones or all zeros in a dynamic switch configuration, as described above.

As further shown in FIG. 10, in some aspects, process 1000 may include transmitting the Type 3 HARQ-ACK based at least in part on the DCI message (block 1020). For example, the UE (e.g., using controller/processor 240, transmit processor 220, TX MIMO processor 230, MOD 232, antenna 234, and/or the like) may transmit the Type 3 HARQ-ACK based at least in part on the DCI message, as described above.

Process 1000 may include additional aspects, such as any single aspect or any combination of aspects described below and/or in connection with one or more other processes described elsewhere herein.

In a first aspect, the first field comprises a one-shot HARQ-ACK request field.

In a second aspect, alone or in combination with the first aspect, the second field comprises a frequency domain resource allocation field.

In a third aspect, alone or in combination with one or more of the first and second aspects, the UE is configured with the resource allocation Type 0, the resource allocation Type 1, or the dynamic switch configuration based at least in part on radio resource control signaling.

In a fourth aspect, alone or in combination with one or more of the first through third aspects, the DCI message includes one or more additional fields that indicate one or more of a value of all ones or all zeros for a HARQ process identification field of the DCI message, a value of all zeros or 1 for a new data indicator field of the DCI message, a value of all ones or all zeros for a modulation and coding scheme field of the DCI message, or a value of all zeros or all ones for a redundancy version field of the DCI message.

In a fifth aspect, alone or in combination with one or more of the first through fourth aspects, a CRC of the DCI message is scrambled with a RNTI.

In a sixth aspect, alone or in combination with one or more of the first through fifth aspects, the RNTI comprises a cell RNTI or a modulation and coding scheme cell RNTI.

In a seventh aspect, alone or in combination with one or more of the first through sixth aspects, the DCI message requests Type 3 HARQ-ACK based at least in part on the first field of the DCI message indicating a request for Type 3 HARQ-ACK and one or more of a value of a modulation and coding scheme field of the DCI message indicating that the DCI message activates semi-persistent scheduling, or a value of the second field of the DCI message indicating that the DCI message activates semi-persistent scheduling.

In an eighth aspect, alone or in combination with one or more of the first through seventh aspects, the DCI indicates to not release semi-persistent scheduling based at least in part on the first field indicating a request for Type 3 HARQ-ACK.

In a ninth aspect, alone or in combination with one or more of the first through eighth aspects, the DCI message indicates to not transmit HARQ-ACK for the DCI message based at least in part on the DCI message indicating a request for Type 3 HARQ-ACK.

In a tenth aspect, alone or in combination with one or more of the first through ninth aspects, the DCI message requests Type 3 HARQ-ACK based at least in part on a value of a new data indicator field of the DCI message indicating scheduling of a retransmission of a message sent using semi-persistent scheduling.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a UE, in accordance with various aspects of the present disclosure. Example process 1100 is an example where the UE (e.g., UE 120) performs operations associated with Type 3 HARQ-ACK.

As shown in FIG. 11, in some aspects, process 1100 may include receiving a DCI message, the DCI message including one or more fields associated with a secondary cell dormancy indication when the DCI message does not indicate a request for Type 3 HARQ-ACK (block 1110). For example, the UE (e.g., using antenna 252, DEMOD 254, MIMO detector 256, receive processor 258, controller/processor 280, and/or the like) may receive a DCI message, the DCI message including one or more fields associated with a secondary cell dormancy indication when the DCI message does not indicate a request for Type 3 HARQ-ACK, as described above.

Process 1100 may include additional aspects, such as any single aspect or any combination of aspects described below and/or in connection with one or more other processes described elsewhere herein.

In a first aspect, the DCI message indicates a request for Type 3 HARQ-ACK based at least in part on a value of a frequency domain resource allocation field of the DCI message including all zeros if resource allocation Type 0 is configured, all ones if resource allocation Type 1 is configured, or all ones or all zeros in a dynamic switch configuration.

In a second aspect, alone or in combination with the first aspect, the DCI message does not indicate a request for Type 3 HARQ-ACK based at least in part on a value of a one-shot HARQ-ACK request field of the DCI message.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: receiving a downlink control information (DCI) message, the DCI message including at least a first field and a second field, the first field indicating a request for Type 3 hybrid automatic repeat request (HARQ) acknowledgment (HARQ-ACK), the second field indicating a physical downlink shared channel (PDSCH) communication is not scheduled when a value of the second field includes: all zeros if resource allocation Type 0 is configured, all ones if resource allocation Type 1 is configured, or all ones or all zeros in a dynamic switch configuration; and transmitting the Type 3 HARQ-ACK based at least in part on the DCI message.

Aspect 2: The method of Aspect 1, wherein the first field comprises a one-shot HARQ-ACK request field.

Aspect 3: The method of any of Aspects 1 through 2, wherein the second field comprises a frequency domain resource allocation field.

Aspect 4: The method of any of Aspects 1 through 3, wherein the UE is configured with the resource allocation Type 0, the resource allocation Type 1, or the dynamic switch configuration based at least in part on radio resource control signaling.

Aspect 5: The method of any of Aspects 1 through 4, wherein the DCI message includes one or more additional fields that indicate one or more of: a value of all ones or all zeros for a HARQ process identification field of the DCI message, a value of all zeros or 1 for a new data indicator field of the DCI message, a value of all ones or all zeros for a modulation and coding scheme field of the DCI message, or a value of all zeros or all ones for a redundancy version field of the DCI message.

Aspect 6: The method any of Aspects 1 through 5, wherein a cyclic redundancy check (CRC) of the DCI message is scrambled with a radio network temporary identifier (RNTI).

Aspect 7: The method of Aspect 6, wherein the RNTI comprises a cell RNTI or a modulation and coding scheme cell RNTI.

Aspect 8: The method of any of Aspects 6 through 7, wherein the DCI message requests Type 3 HARQ-ACK based at least in part on the first field of the DCI message indicating a request for Type 3 HARQ-ACK and one or more of: a value of a modulation and coding scheme field of the DCI message indicating that the DCI message activates semi-persistent scheduling, or a value of the second field of the DCI message indicating that the DCI message activates semi-persistent scheduling.

Aspect 9: The method of any of Aspects 6 through 8, wherein the DCI indicates to not release semi-persistent scheduling based at least in part on the first field indicating a request for Type 3 HARQ-ACK.

Aspect 10: The method of any of Aspects 6 through 9, wherein the DCI message indicates to not transmit HARQ-ACK for the DCI message based at least in part on the DCI message indicating a request for Type 3 HARQ-ACK.

Aspect 11: The method of any of Aspects 6 through 10, wherein the DCI message requests Type 3 HARQ-ACK based at least in part on a value of a new data indicator field of the DCI message indicating scheduling of a retransmission of a message sent using semi-persistent scheduling.

Aspect 12: A method of wireless communication performed by a user equipment (UE), comprising: receiving a downlink control information (DCI) message, the DCI message including one or more fields associated with a secondary cell dormancy indication when the DCI message does not indicate a request for Type 3 hybrid automatic repeat request (HARD) acknowledgment (HARQ-ACK).

Aspect 13: The method of Aspect 12, wherein the DCI message indicates a request for Type 3 HARQ-ACK based at least in part on a value of a frequency domain resource allocation field of the DCI message including: all zeros if resource allocation Type 0 is configured, all ones if resource allocation Type 1 is configured, or all ones or all zeros in a dynamic switch configuration.

Aspect 14: The method of Aspect 12, wherein the DCI message does not indicate a request for Type 3 HARQ-ACK based at least in part on a value of a one-shot HARQ-ACK request field of the DCI message.

Aspect 16: An apparatus for wireless communication at a device, comprising a processor; memory coupled with the processor; and instructions stored in the memory and executable by the processor to cause the apparatus to perform the method of one or more Aspects of Aspects 1-14.

Aspect 17: A device for wireless communication, comprising a memory and one or more processors coupled to the memory, the one or more processors configured to perform the method of one or more Aspects of Aspects 1-14.

Aspect 18: An apparatus for wireless communication, comprising at least one means for performing the method of one or more Aspects of Aspects 1-14.

Aspect 19: A non-transitory computer-readable medium storing code for wireless communication, the code comprising instructions executable by a processor to perform the method of one or more Aspects of Aspects 1-14.

Aspect 20: A non-transitory computer-readable medium storing a set of instructions for wireless communication, the set of instructions comprising one or more instructions that, when executed by one or more processors of a device, cause the device to perform the method of one or more Aspects of Aspects 1-14.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving a downlink control information (DCI) message, the DCI message including at least a first field and a second field, the first field indicating a request for Type 3 hybrid automatic repeat request (HARD) acknowledgment (HARQ-ACK), the second field indicating a physical downlink shared channel (PDSCH) communication is not scheduled when a value of the second field includes:
    all zeros if resource allocation Type 0 is configured,
    all ones if resource allocation Type 1 is configured, or
    all ones or all zeros if both the resource allocation Type 0 and the resource allocation Type 1 are configured; and
    transmitting the Type 3 HARQ-ACK based at least in part on the DCI message.

2. The method of claim 1, wherein the first field comprises a one-shot HARQ-ACK request field.

3. The method of claim 1, wherein the second field comprises a frequency domain resource allocation field.

4. The method of claim 1, wherein the UE is configured with the resource allocation Type 0, the resource allocation Type 1, or both the resource allocation Type 0 and the resource allocation Type 1 based at least in part on radio resource control signaling.

5. The method of claim 1, wherein the DCI message includes one or more additional fields that indicate one or more of:
    a value of all ones or all zeros for a HARQ process identification field of the DCI message,
    a value of all zeros or 1 for a new data indicator field of the DCI message, a value of all ones or all zeros for a modulation and coding scheme field of the DCI message, or a value of all zeros or all ones for a redundancy version field of the DCI message.

6. The method of claim 1, wherein a cyclic redundancy check (CRC) of the DCI message is scrambled with a radio network temporary identifier (RNTI).

7. The method of claim 6, wherein the RNTI comprises a cell RNTI or a modulation and coding scheme cell RNTI.

8. The method of claim 6, wherein the DCI message requests Type 3 HARQ-ACK based at least in part on the first field of the DCI message indicating a request for Type 3 HARQ-ACK and one or more of:
a value of a modulation and coding scheme field of the DCI message indicating that the DCI message activates semi-persistent scheduling, or
a value of the second field of the DCI message indicating that the DCI message activates semi-persistent scheduling.

9. The method of claim 6, wherein the DCI indicates to not release semi-persistent scheduling based at least in part on the first field indicating a request for Type 3 HARQ-ACK.

10. The method of claim 6, wherein the DCI message indicates to not transmit HARQ-ACK for the DCI message based at least in part on the DCI message indicating a request for Type 3 HARQ-ACK.

11. The method of claim 6, wherein the DCI message requests Type 3 HARQ-ACK based at least in part on a value of a new data indicator field of the DCI message indicating scheduling of a retransmission of a message sent using semi-persistent scheduling.

12. A user equipment (UE) for wireless communication, comprising:
a memory; and
one or more processors coupled to the memory, the one or more processors configured to:
receive a downlink control information (DCI) message, the DCI message including at least a first field and a second field, the first field indicating a request for Type 3 hybrid automatic repeat request (HARD) acknowledgment (HARQ-ACK), the second field indicating a physical downlink shared channel (PDSCH) communication is not scheduled when a value of the second field includes:
all zeros if resource allocation Type 0 is configured,
all ones if resource allocation Type 1 is configured, or
all ones or all zeros if both the resource allocation Type 0 is configured and the resource allocation Type 1 are configured; and
transmit the Type 3 HARQ-ACK based at least in part on the DCI message.

13. The UE of claim 12, wherein the first field comprises a one-shot HARQ-ACK request field.

14. The UE of claim 12, wherein the second field comprises a frequency domain resource allocation field.

15. The UE of claim 12, wherein the UE is configured with the resource allocation Type 0, the resource allocation Type 1, or both the resource allocation Type 0 and resource allocation Type 1 based at least in part on radio resource control signaling.

16. The UE of claim 12, wherein the DCI message includes one or more additional fields that indicate one or more of:
a value of all ones or all zeros for a HARQ process identification field of the DCI message, a value of all zeros or 1 for a new data indicator field of the DCI message, a value of all ones or all zeros for a modulation and coding scheme field of the DCI message, or
a value of all zeros or all ones for a redundancy version field of the DCI message.

17. The UE of claim 12, wherein a cyclic redundancy check (CRC) of the DCI message is scrambled with a radio network temporary identifier (RNTI).

18. The UE of claim 17, wherein the RNTI comprises a cell RNTI or a modulation and coding scheme cell RNTI.

19. The UE of claim 17, wherein the DCI message requests Type 3 HARQ-ACK based at least in part on the first field of the DCI message indicating a request for Type 3 HARQ-ACK and one or more of:
a value of a modulation and coding scheme field of the DCI message indicating that the DCI message activates semi-persistent scheduling, or
a value of the second field of the DCI message indicating that the DCI message activates semi-persistent scheduling.

20. The UE of claim 17, wherein the DCI indicates to not release semi-persistent scheduling based at least in part on the first field indicating a request for Type 3 HARQ-ACK.

21. The UE of claim 17, wherein the DCI message indicates to not transmit HARQ-ACK for the DCI message based at least in part on the DCI message indicating a request for Type 3 HARQ-ACK.

22. The UE of claim 17, wherein the DCI message requests Type 3 HARQ-ACK based at least in part on a value of a new data indicator field of the DCI message indicating scheduling of a retransmission of a message sent using semi-persistent scheduling.

23. An apparatus for wireless communication, comprising:
means for receiving a downlink control information (DCI) message, the DCI message including at least a first field and a second field, the first field indicating a request for Type 3 hybrid automatic repeat request (HARD) acknowledgment (HARQ-ACK), the second field indicating a physical downlink shared channel (PDSCH) communication is not scheduled when a value of the second field includes:
all zeros if resource allocation Type 0 is configured,
all ones if resource allocation Type 1 is configured, or
all ones or all zeros if both the resource allocation Type 0 is configured and the resource allocation Type 1 are configured; and
means for transmitting the Type 3 HARQ-ACK based at least in part on the DCI message.

24. The apparatus of claim 23, wherein the first field comprises a one-shot HARQ-ACK request field.

25. The apparatus of claim 23, wherein the second field comprises a frequency domain resource allocation field.

26. The apparatus of claim 23, wherein a cyclic redundancy check (CRC) of the DCI message is scrambled with a radio network temporary identifier (RNTI).

27. A non-transitory computer-readable medium storing a set of instructions for wireless communication includes one or more instructions that, when executed by one or more processors of a user equipment (UE), cause the UE to:
receive a downlink control information (DCI) message, the DCI message including at least a first field and a second field, the first field indicating a request for Type 3 hybrid automatic repeat request (HARD) acknowledgment (HARQ-ACK), the second field indicating a physical downlink shared channel (PDSCH) communication is not scheduled when a value of the second field includes:

all zeros if resource allocation Type 0 is configured, all ones if resource allocation Type 1 is configured, or all ones or all zeros if both the resource allocation Type 0 is configured and resource allocation Type 1 are configured; and transmit the Type 3 HARQ-ACK based at least in part on the DCI message.

28. The non-transitory computer-readable medium of claim 27, wherein the first field comprises a one-shot HARQ-ACK request field.

29. The non-transitory computer-readable medium of claim 27, wherein the second field comprises a frequency domain resource allocation field.

30. The non-transitory computer-readable medium of claim 27, wherein the UE is configured with the resource allocation Type 0, the resource allocation Type 1, or the both the resource allocation Type 0 and the resource allocation Type 1 based at least in part on radio resource control signaling.

31. The non-transitory computer-readable medium of claim 27, wherein the DCI message includes one or more additional fields that indicate one or more of:
  a value of all ones or all zeros for a HARQ process identification field of the DCI message, a value of all zeros or 1 for a new data indicator field of the DCI message, a value of all ones or all zeros for a modulation and coding scheme field of the DCI message, or
  a value of all zeros or all ones for a redundancy version field of the DCI message.

32. The non-transitory computer-readable medium of claim 27, wherein a cyclic redundancy check (CRC) of the DCI message is scrambled with a radio network temporary identifier (RNTI).

* * * * *